(12) United States Patent
Kitajima et al.

(10) Patent No.: US 7,413,138 B2
(45) Date of Patent: Aug. 19, 2008

(54) REEL UNIT OF SPINNING REEL

(75) Inventors: Keigo Kitajima, Osaka (JP); Hirokazu Hiraoka, Osaka (JP); Shingo Matsuo, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/949,320

(22) Filed: Dec. 3, 2007

(65) Prior Publication Data
US 2008/0149750 A1    Jun. 26, 2008

(51) Int. Cl.
*A01K 89/01* (2006.01)
(52) U.S. Cl. .................. 242/311; 242/310; 242/316; D22/140; D22/141
(58) Field of Classification Search .................. 242/310, 242/311, 312, 316; D22/140, 141
See application file for complete search history.

(56) References Cited

U.S. PATENT DOCUMENTS

| | | | | |
|---|---|---|---|---|
| 6,880,776 | B2* | 4/2005 | Kitajima | 242/310 |
| 7,051,967 | B2* | 5/2006 | Kitajima | 242/316 |
| 2003/0066920 | A1* | 4/2003 | Kitajima | 242/310 |
| 2003/0136867 | A1* | 7/2003 | Kitajima | 242/310 |
| 2003/0146324 | A1* | 8/2003 | Yeh | 242/311 |
| 2003/0146325 | A1* | 8/2003 | Kitajima | 242/311 |
| 2004/0021023 | A1* | 2/2004 | Kitajima | 242/316 |
| 2004/0200917 | A1* | 10/2004 | Nishikawa | 242/311 |

FOREIGN PATENT DOCUMENTS

JP    H06-21336 Y    6/1994

* cited by examiner

*Primary Examiner*—Emmanuel M Marcelo
(74) *Attorney, Agent, or Firm*—Shinjyu Global IP

(57) ABSTRACT

An object of the present invention is to make it possible to easily fix a cover member to a reel unit of a spinning reel while exposure of a fixing member to a rear portion of the reel unit is reduced. A reel unit includes a reel body, a lid member, a reel unit protection member, and an intermediate member. The reel body includes an accommodation space that opens to a lateral side, a first insertion hole that is communicated with the accommodation space, and a second insertion hole that is disposed on the opposite side of the first insertion hole and is communicated with the accommodation space. The lid member is detachably/reattachably mounted to the reel body so as to cover the accommodation space. The reel unit protection member is mounted from backward so as to cover the reel body and the lid member, and includes a boss that passes through the first insertion hole from a rear portion of the reel body and protrudes toward the accommodation space. The intermediate member is non-movably provided in the reel body within the accommodation space, and retains a screw member fixed to a front end portion of the boss in the accommodation space.

20 Claims, 19 Drawing Sheets

US 7,413,138 B2

REEL UNIT OF SPINNING REEL

CROSS-REFERENCE TO THE RELATED APPLICATIONS

This application claims priority to Japanese Patent Application Nos. 2006-344913 and 2006-344914. The entire disclosure of Japanese Patent Application Nos. 2006-344913 and 2006-344914 is hereby incorporated herein by reference.

TECHNICAL FIELD

The present invention relates to a reel unit, and in particular to a reel unit of a spinning reel that is mounted to a fishing rod and is capable of reeling out fishing line.

BACKGROUND ART

A spinning reel includes a reel unit, a rotor that is rotatably supported on the front portion of the reel unit, and a spool that fishing line is wound around the outer peripheral surface thereof. The reel unit includes a reel body and a lid member. The reel body has an accommodation space in the interior thereof, and the accommodation space opens to the lateral side. The lid member is detachably/reattachably mounted to the reel body so as to cover the opening of the reel body. In the conventional reel units, screw members such as screws are screwed into a plurality of positions of a chassis while a lid member is interposed between the chassis and the screw members, and thus the lid member is fixed to the chassis. When the lid member is fixed to a chassis by the screw members in this way, recesses in which head portions of the screw members are accommodated are exposed to the external appearance. Therefore, it is difficult to form a reel unit with a quality appearance. In addition, there is a possibility that foreign materials such as bait and dust are attached to the recesses.

In order to solve this kind of problem, the hitherto known arts have been known, which discloses a spinning reel including a reel unit in which screw members are not exposed to the external appearance thereof. Japanese Utility Model Publication No. H06-21336 discloses such reel as an example. A reel unit of a conventional spinning reel includes a reel unit and a lid member. The front portion of the reel body and that of the lid member are disposed in the interior of a rotor, and the lid member is fixed by a screw member that is disposed in the front portion. In addition, the rear portion of the reel body and that of the lid member are covered with a cover member. The cover member is fixed to the reel body by two screw members (an example of a fixing member) that are inserted from the front portion of the reel unit. The fixing members for fixing the cover member to the reel body are disposed in left and right positions on the reel unit, respectively, so as to extend along a spool shaft in a front-to-rear direction. In the conventional reel unit with this configuration, the cover member is fixed to the reel body by the screw members that are inserted form the rotor side. Accordingly, when the cover member is mounted to the reel body, the screw member is not exposed to the rear portion of the reel unit.

SUMMARY OF THE INVENTION

Problems the Invention is to Solve

With the above conventional configuration, the fixing members are not exposed to the rear portion of the reel unit. Therefore, it is possible to enhance design of the external appearance of the reel. However, the cover member is fixed to the reel unit by two long screw members that penetrate the reel unit along the spool shaft. Therefore, it is difficult to screw the fixing members into the cover member while the fixing members penetrate straight the accommodation space, and thus it is difficult to fix the cover member to the reel unit easily.

An object of the present invention is to make it possible to easily fix a cover member to a reel unit of a spinning reel while exposure of a fixing member to a rear portion of the reel unit is reduced.

Means to Solve the Problems

A reel unit of a spinning reel in accordance with a first aspect of the present invention is a reel unit that is mounted to a fishing rod and is capable of reeling out fishing line forward, and includes a reel body, a lid member, a cover member, and an intermediate member. The reel body includes an accommodation space that opens to a lateral side, a first insertion portion that is communicated with the accommodation space, and a second insertion portion that is disposed on the opposite side of the first insertion portion and is communicated with the accommodation space. The lid member is a member that is detachably/reattachably mounted to the reel body so as to cover the accommodation space. The cover member is a member mounted from backward so as to cover the reel body and the lid member, and includes a boss that passes through the first insertion portion from a rear portion of the reel body and protrudes toward the accommodation space. The intermediate member is a member for fixing a front end portion of the boss in the accommodation space, and is non-movably provided in either the reel body or the lid member within the accommodation space.

In this reel unit, when the cover member is fixed to the reel body (or the lid member), the boss is inserted into the first insertion portion such that it passes through the first insertion portion. Then, the front end portion of the boss is fixed to the intermediate member being non-movably provided on at least one of the reel body and the lid member. With this configuration, the cover member is fixed to the reel body (or the lid member).

In this configuration, the cover member is fixed to the reel body (or the lid member) by fixing the front end portion of the boss to the intermediate member being disposed non-movably with respect to the reel body (or the lid member). Therefore, it is possible to easily fix the cover member to the reel body (or the lid member), and it is also possible to prevent the screw member from being exposed to the rear portion of the reel unit.

The reel unit of a spinning reel in accordance with a second aspect of the present invention is the reel unit according to the first aspect of the present invention in which the intermediate member is a retaining member for retaining a first fixing means of fixing the front end portion of the boss.

With this configuration, when the cover member is fixed to the reel body (or the lid member), the first fixing means is preliminarily retained by the retaining member. Then, for the purpose of fixing the cover member, the boss is inserted into the first insertion portion such that it passes through the first insertion portion. Thus, the boss is disposed in the accommodation space. When the cover member is mounted such that the boss is disposed in the accommodation space, a tool such as a driver or an Allen key is inserted into the second insertion portion from the outside of the reel body. Then, motion such as rotation is applied to the first fixing means that is retained by the retaining member, and thus the front end portion of the boss is fixed to the retaining member. With this configuration, the cover member is fixed to the reel body (or the lid member).

In this configuration, the cover member is fixed to the reel body (or the lid member) when the first fixing means, which is retained by the retaining member disposed non-movably with respect to the reel body (or the lid member), is moved by a tool from the outside, and the front end portion of the boss is fixed to the retaining member. Therefore, when a screw member is used as the first fixing means, it is possible to use a short screw member. Therefore, it is possible to easily fix the cover member to the reel body (or the lid member), and it is also possible to prevent the screw member from being exposed to the rear portion of the reel unit.

The reel unit of a spinning reel in accordance with a third aspect of the present invention is the reel unit according to the second aspect of the present invention in which the reel body further includes a cap member that is capable of capping the second insertion portion. With this configuration, even when the second insertion portion is provided, it is possible to enhance airtightness of the reel body.

The reel unit of a spinning reel in accordance with a fourth aspect of the present invention is the reel unit according to second or third aspect of the present invention in which the first fixing means is a screw member including a head portion, and a shaft portion that is formed to have a diameter smaller than that of the head portion and includes a male threaded portion on an outer peripheral portion thereof, and the boss includes a female threaded portion into which a male threaded portion of the screw member is screwed in the tip thereof. In this configuration, the head portion of the screw member is not exposed to the rear portion of the reel unit.

The reel unit of a spinning reel in accordance with a fifth aspect of the present invention is the reel unit according to the fourth aspect of the present invention in which the screw member is a tapping screw and the female threaded portion is formed by the tapping screw. In this configuration, it is not necessary to preliminarily form the female threaded portion by a threading processing. Accordingly, it is possible to reduce manufacturing cost.

The reel unit of a spinning reel according to a sixth aspect of the present invention is the reel unit according to one of the second to fifth aspects of the present invention in which the retaining member is separately formed from the reel body. In this configuration, it is possible to form the reel body and the retaining member in a simple shape, and thus it is easy to form them.

The reel unit of a spinning reel in accordance with a seventh aspect of the present invention is the reel unit according to the sixth aspect of the present invention in which the reel body includes a first interlocked portion that is formed in the accommodation space, and the retaining member includes a first interlocking portion that is allowed to be interlocked with the first interlocked portion so as to be relatively non-movably mounted to the reel body. In this configuration, it is possible to prevent the retaining member from moving with respect to the reel body only by interlocking. Accordingly, the configuration for non-movably coupling the retaining member to the reel body is simplified.

The reel unit of a spinning reel in accordance with an eighth aspect of the present invention is the reel unit according to one of the second to fifth aspects of the present invention in which the retaining member is integrally formed with the reel body. In this configuration, the configuration of the retaining member is simplified because it is not necessary to non-movably couple the retaining member to the reel body.

The reel unit of a spinning reel in accordance with a ninth aspect of the present invention is the reel unit according to one of the fourth to eighth aspects of the present invention in which the retaining member includes a through hole through which the shaft portion of the screw member passes. In this configuration, it is possible to retain the screw member by the through hole of the retaining member.

The reel unit of a spinning reel in accordance with a tenth aspect of the present invention is the reel unit according to the ninth aspect of the present invention in which the retaining member further includes a head accommodation portion in which the head portion of the screw member is allowed to be accommodated. In this configuration, the screw member is not easily dropped off before the cover member is fixed, because the head portion of the screw member is accommodated in the head accommodation portion.

The reel unit of a spinning reel in accordance with an eleventh aspect of the present invention is the reel unit according to the first aspect of the present invention in which the intermediate member includes a front end portion fixed to the reel body by a second fixing means and a rear end portion fixed to the boss by a third fixing means.

In this reel unit, when the cover member is fixed to the reel body, the cover member is mounted to the reel body from backward of the reel body and the lid member, and the front end portion of the intermediate member is fixed to the reel body by the second fixing means (or the rear end portion of the intermediate member is fixed to the boss of the cover member by the third fixing means), while the rear end portion of the intermediate member is fixed to the boss of the cover member by the third fixing means (or while the front end portion of the intermediate member is fixed to the reel body by the second fixing means), for instance. Accordingly, the cover member is fixed to the reel body. In this configuration, the intermediate member is allowed to be fixed to the reel body (or the cover member) while the intermediate member is provided between the cover member and the reel body and the intermediate member is preliminarily fixed to the cover member (or the reel body). Accordingly, when a screw member is used as the second fixing means, it is possible to use a short screw member. Therefore, it is possible to easily fix the cover member, and it is also possible to prevent the screw member from being exposed to the rear portion of the reel unit by mounting the second fixing means from the frontward of the reel body.

A reel unit of a spinning reel in accordance with a twelfth aspect of the present invention is the reel unit according to the eleventh aspect of the present invention in which the front end portion of the intermediate member is fixed to the reel body by the second fixing means inserted from a front side. In this configuration, the second fixing means is inserted from the front side of the reel body. Therefore, the second fixing means is not exposed to the rear portion of the reel unit.

A reel unit of a spinning reel in accordance with a thirteenth aspect of the present invention is the reel unit according to the twelfth aspect of the present invention in which the first second means is a screw member including a head portion and a shaft portion that is formed to have a diameter smaller than a diameter of the head portion and includes a male threaded portion on an outer peripheral portion thereof, and the intermediate member includes a female threaded portion into which the male threaded portion of the screw member is screwed. In this configuration, the head portion of the screw member is not exposed to the rear portion of the reel unit.

A reel unit of a spinning reel in accordance with a fourteenth aspect of the present invention is the reel unit according to one of the eleventh to thirteenth aspects of the present invention in which the third fixing means is a screw member including a head portion and a shaft portion that is formed to have a diameter smaller than a diameter of the head portion and includes a male threaded portion on an outer peripheral portion thereof, and a rear end portion of the intermediate member includes a through hole through which the shaft portion of the screw member is inserted and passes, and the boss includes a female threaded portion into which the male threaded portion of the screw member is screwed on a tip thereof. In this configuration, the third fixing means is also configured to be a screw member. Therefore, the third fixing means is configured to be simple.

A reel unit of a spinning reel in accordance with a fifteenth aspect of the present invention is the reel unit according to one of the third and fourteenth aspects of the present invention in which the screw member is a tapping screw, and the female threaded portion is formed by the tapping screw. In this configuration, it is not necessary to preliminarily form the female threaded portion by a threading processing. Accordingly, it is possible to reduce manufacturing cost.

A reel unit of a spinning reel in accordance with a sixteenth aspect of the present invention is the reel unit according to one of the first to thirteenth aspects of the present invention in which the third fixing means includes a second interlocking portion that is disposed in a rear end portion of the intermediate member, and the boss includes a second interlocked portion with which the second interlocking portion is interlocked. In this configuration, it is possible to easily fix the cover member to the intermediate member without a tool.

A reel unit of a spinning reel in accordance with a seventeenth aspect of the present invention is the reel unit according to the sixteenth aspect of the present invention in which the third fixing means fixes the second interlocking portion of the intermediate member to the second interlocked portion of the boss by elastically interlocking. In this configuration, elastic interlocking is used for fixing, and thus it is possible to repeatedly perform fixing and unfixing.

A reel unit of a spinning reel in accordance with an eighteenth aspect of the present invention is the reel unit according to one of the sixth and seventeenth aspects of the present invention, and further includes an interlocking condition switching unit for switching an interlocking condition of the third fixing means between an interlocked condition and an uninterlocked condition depending on the interlocking condition of the second fixing means. In this configuration, the interlocking condition of the third fixing means is allowed to be switched between the interlocked condition and the uninterlocked condition by changing the interlocking condition of the second fixing means. Accordingly, attachment and detachment of the cover member is easily performed.

EFFECTS OF THE INVENTION

According to the present invention, the cover member is fixed to the reel body (or the lid member) by fixing the front end portion of the boss to the intermediate member being disposed non-movably with respect to the reel body (or the lid member). Therefore, it is possible to easily fix the cover member to the reel body (or the lid member), and it is also possible to prevent the screw member from being exposed to the rear portion of the reel unit.

According to the another present invention, the cover member is fixed to the reel body (or the lid member) when the retaining member retaining the first fixing means is disposed in the accommodation space so as to be non-movable with respect to the reel body (or the lid member) and the retained first fixing means is fixed to the front end portion of the boss by a tool from outside. Accordingly, when a screw member is used as the first fixing means, it is possible to use a short screw member. Therefore, it is possible to easily fix the cover member to the reel body (or the lid member), and it is also possible to prevent the screw member from being exposed to the rear portion of the reel unit.

According to the still another present invention, it is possible to fix the intermediate member to the reel body (or the cover member) while the intermediate member is provided between the cover member and the reel body and the intermediate member is preliminarily fixed to the cover member (or the reel body). Accordingly, when a screw member is used as the first fixing means, it is possible to use a short screw member. Therefore, it is possible to easily fix the cover member, and it is also possible to prevent the screw member from being exposed to the rear portion of the reel unit by mounting the first fixing means from the frontward of the reel body.

BRIEF DESCRIPTION OF THE DRAWINGS

Referring now to the attached drawings which form a part of this original disclosure.

BEST MODE OF CARRYING OUT THE INVENTION

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

First Embodiment

Figure 1:
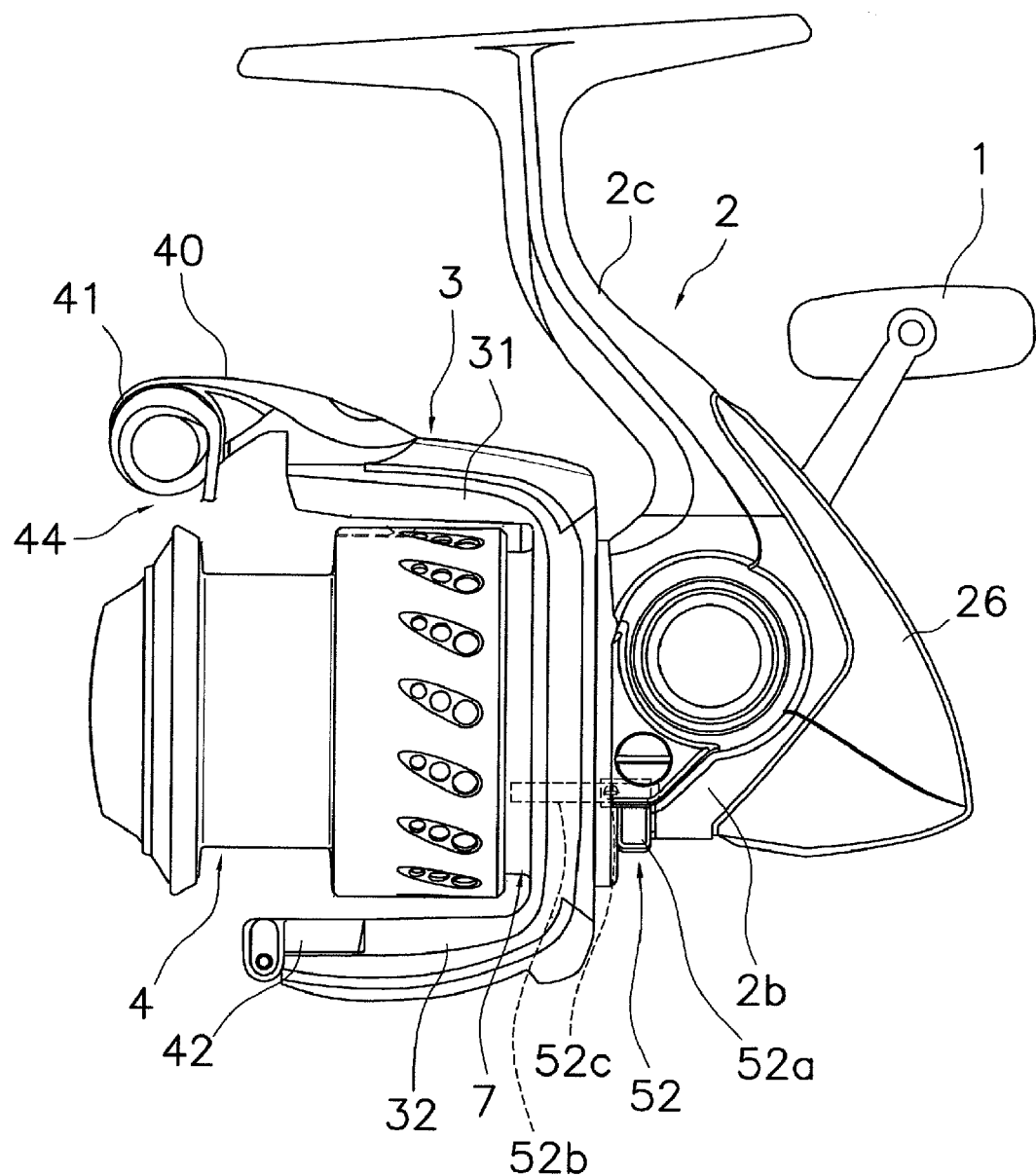
FIG. 1 is a lateral view of a spinning reel according to a first embodiment of the present invention

As illustrated in FIG. 1, a spinning reel in accordance with an embodiment of the present invention includes a handle 1, a reel unit 2 that rotatably supports the handle 1, a rotor 3, and a spool 4. The rotor 3 is rotatably supported on the front portion of the reel unit 2. The spool 4 serves to wind fishing line around its outer peripheral surface, and is disposed on the front portion of the rotor 3 so as to be allowed to move in a front-to-rear direction. Note that the handle 1 is capable of being mounted to either the left side or the right side of the reel unit 2.

<Reel Unit Configuration>

Figure 2:
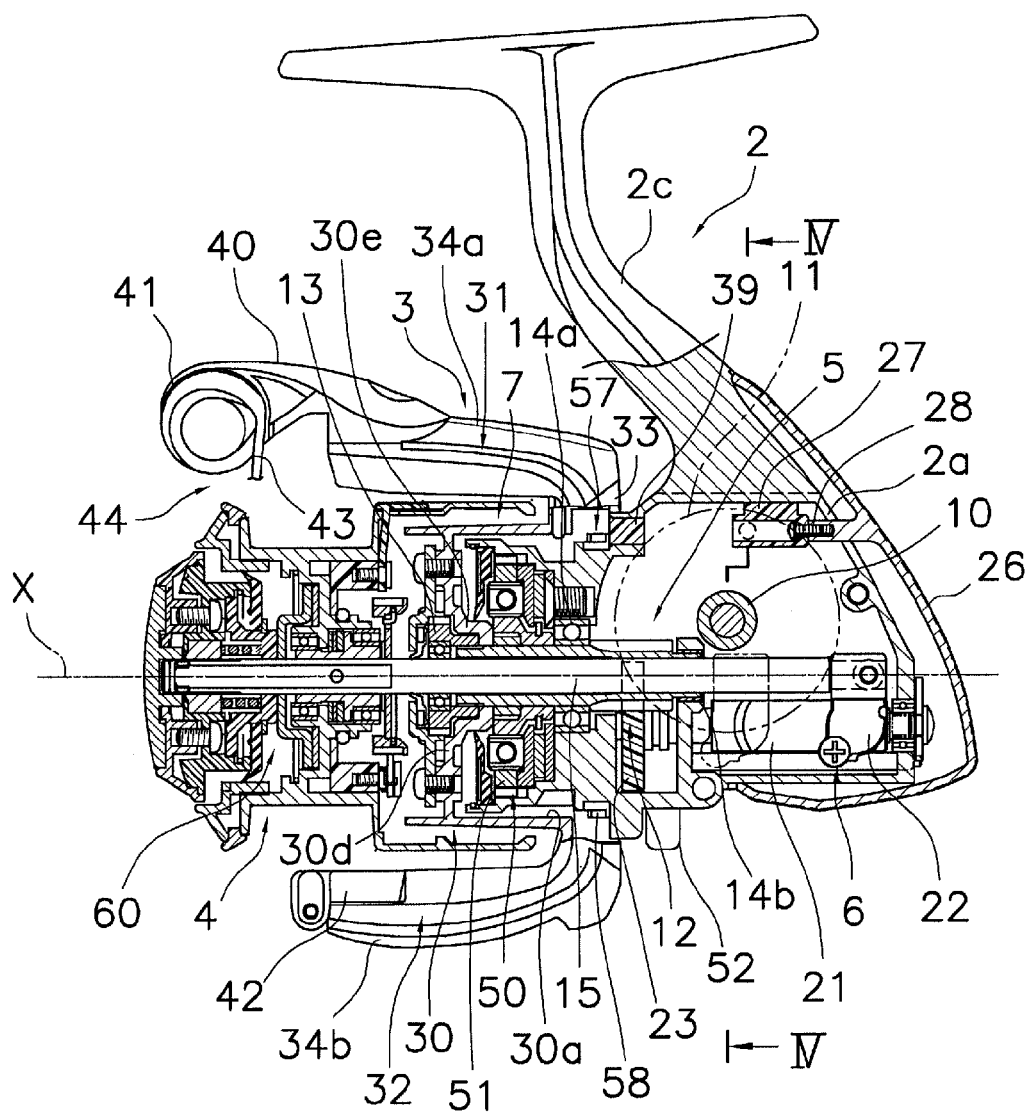
FIG. 2 is a lateral cross-sectional view of the spinning reel
Figure 3:
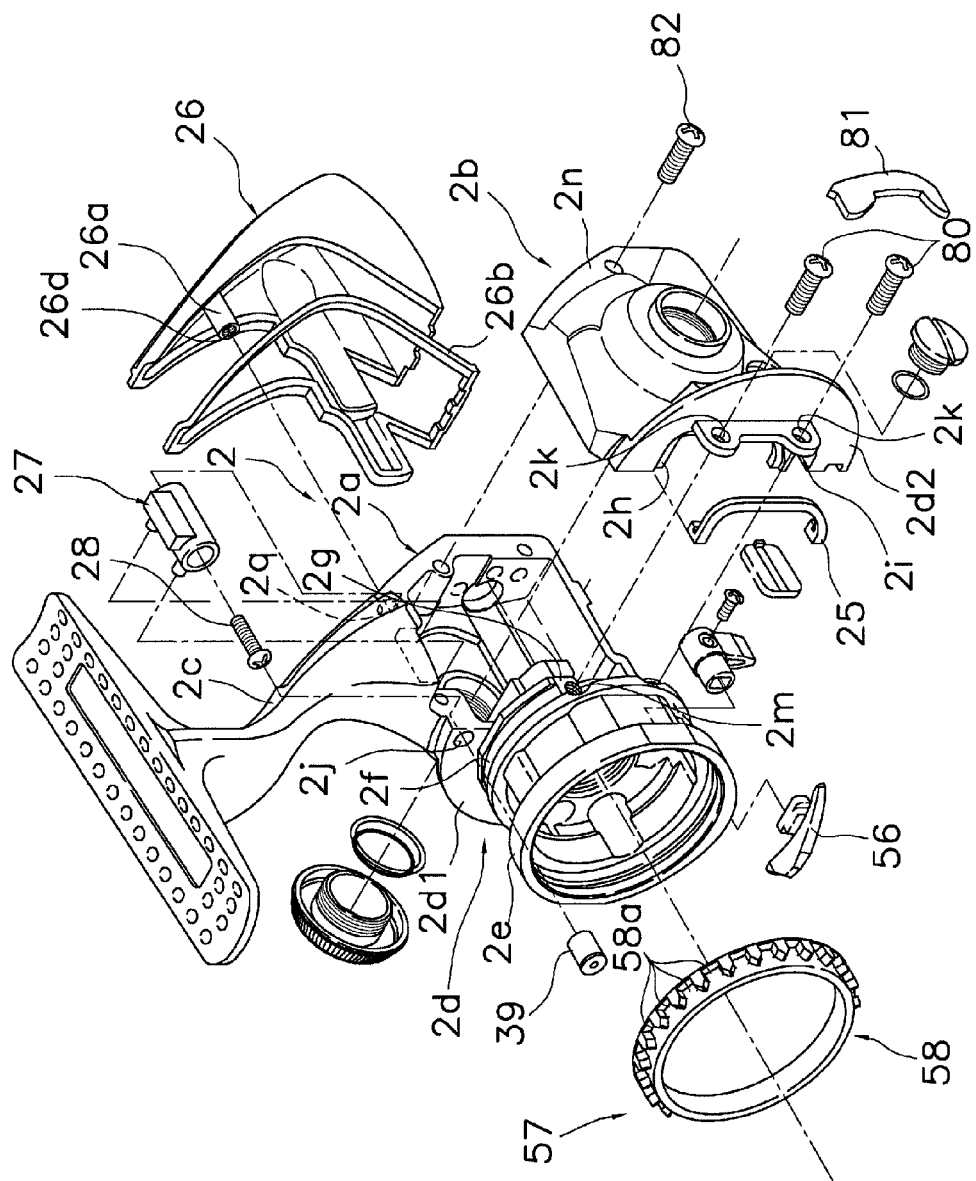
FIG. 3 is an exploded perspective view of the spinning reel

As illustrated in FIGS. 2 and 3, the reel unit 2 includes a reel body 2a having an accommodation space RA in its interior, and a lid member 2b (see FIG. 3) detachably/reattachably mounted to the reel body 2a so as to enclose the accommodation space RA formed in the interior of the reel body 2a. In addition, the reel unit 2 includes a reel unit protection member 26 (an example of the cover member) that covers the rear portion of the reel body 2a and that of the lid member 2b, and a retaining member 27 (an example of the intermediate member) that is provided in the accommodation space RA so as to be non-movable with respect to the reel body 2a and retains a screw member 28 (an example of the first fixing means) fixed to the front end portion of the reel unit protection member 26 in the accommodation space RA.

The reel body 2a is made of a light alloy such as a magnesium alloy and an aluminum alloy, and is formed integrally with a T-shaped rod attachment leg 2c that is formed on the top of the reel body 2a to extend in a front-to-rear direction. As illustrated in FIG. 2, the accommodation space RA of the reel body 2a accommodates a rotor driving mechanism 5 and an oscillation mechanism 6. A first insertion hole 2q (an example of a first insertion portion) is formed in the rear portion of the reel body 2a along a front-to-rear direction. As illustrated FIG. 3, a first flange portion 2d1 and a cylindrical portion 2e are formed on the front end of the reel body 2a. The first flange portion 2d1 is formed in a substantially semicircular shape and makes up a part of a circular flange 2d. The cylindrical portion 2e is open to the front and the diameter thereof is smaller than that of the flange 2d. A second insertion hole 2j (an example of a second insertion portion) is formed in the upper portion of the first flange portion 2d1. A tool for screwing the first screw member 28 that is used to fix the reel unit protection member 26 is allowed to pass through the second insertion hole 2j and reach the accommodation space RA. The second insertion hole 2j is disposed to face the first insertion hole 2q at a opposite side from the first insertion hole 2q, and is also concentrically disposed with respect to the first insertion hole 2q. The second insertion hole 2j is formed at a position where the second insertion hole 2j is covered with the rotor 3. The second insertion hole 2j is capped by an elastic cap 39 (an example of cap member), for instance, after the reel unit protection member 26 is fixed by means of the first screw member 28.

Figure 5:
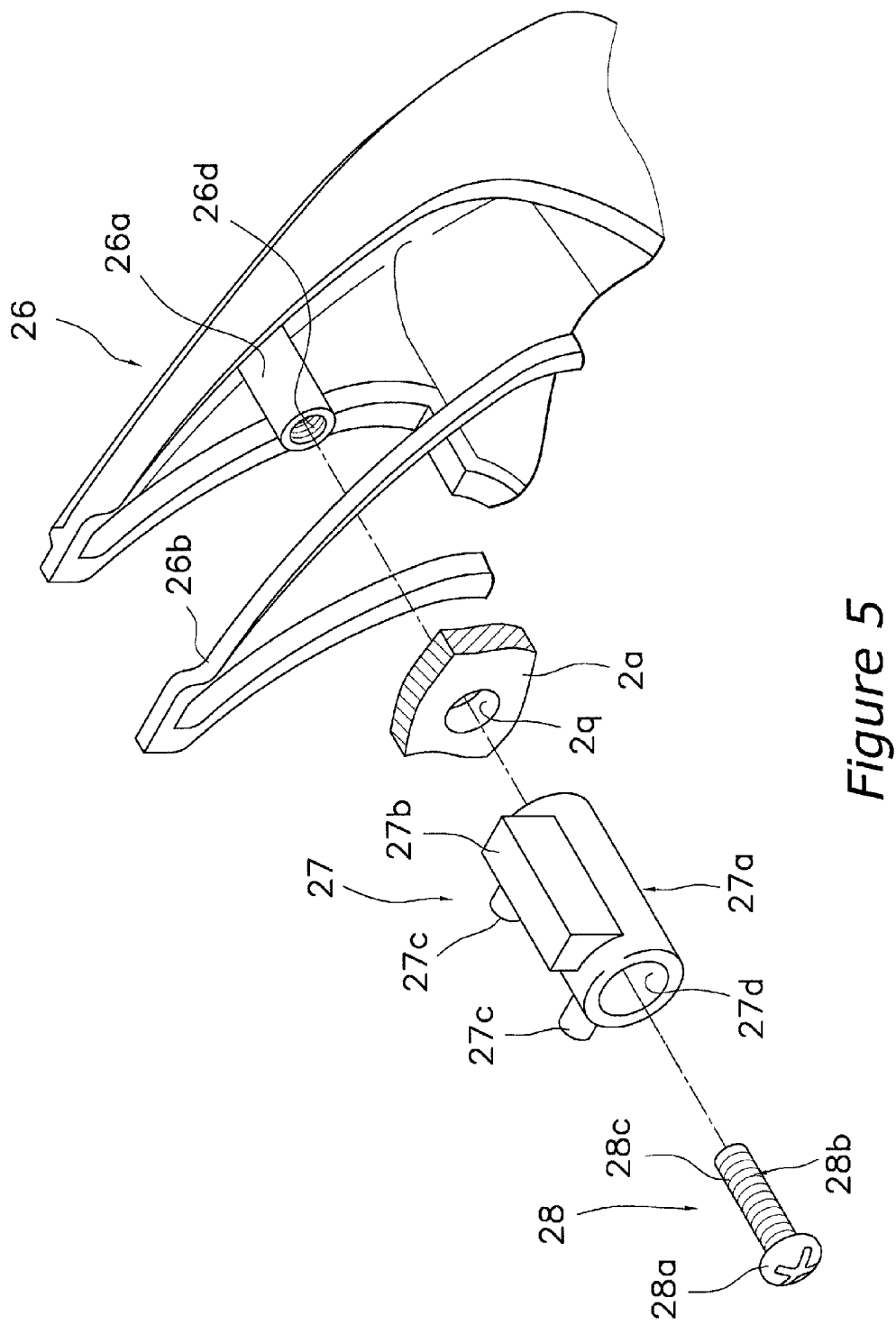
FIG. 5 is an enlarged exploded perspective view of a part of the spinning reel to which a reel unit protection member is mounted.
Figure 6:
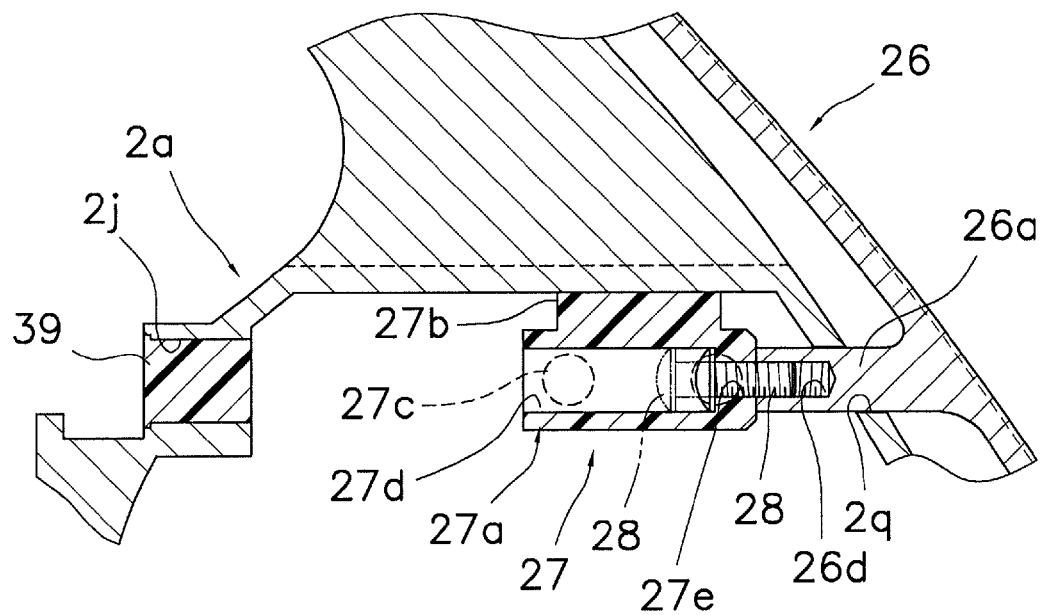
FIG. 6 is an enlarged cross-sectional view of the part of the spinning reel to which the reel unit protection member is mounted.

As illustrated in FIGS. 5 and 6, the first screw member 28 is a member that includes a head portion 28a and a shaft portion 28b. The shaft portion 28b is formed to have a diameter smaller than that of the head portion 28a, and a male threaded portion 28c is formed on the outer peripheral portion of the shaft portion 28b. The second insertion hole 2j is formed to have a diameter so that a shaft portion of a driver or an Allen key, which is to be engaged with the head portion 28a of the first screw member 28, is allowed to pass through the second insertion hole 2j. A mounting groove 2f is formed in the base end portion of the cylindrical portion 2e on the flange 2d side, and the cross-section thereof is cut out in a circular shape. In addition, as illustrated in FIG. 3, an elastic braking member 58 of a rotor braking mechanism 57 is mounted in the mounting groove 2f. The braking member 58 is allowed to brake the rotor 3 when a bail arm 44 to be described is positioned in the line-releasing posture.

The lid member 2b is made of a light metal such as a magnesium alloy or an aluminum alloy. The lid member 2b is fixed to the reel body 2a by means of two fixing bolts 80, and the fixing bolts 80 are fixed at two spots of the front side of the lid member 2b, which are covered with the rotor 3. In addition, the lid member 2b is fixed to the reel body 2a by means of one fixing bolt 82, and the fixing bolt 82 is fixed at a spot of the rear side of the lid member 2b to be disposed away from the rotor 3. Note that the fixing bolt 82 fixes the lid member 2b to the reel body 2a at a position where the fixing bolt 82 is covered with the reel unit protection member 26.

A second flange portion 2d2 is formed on the front end of the lid member 2b. The second flange portion 2d2 is formed in an approximately semi-circular shape, and forms a circular flange 2d together with a first flange portion 2d1. A plate-shaped portion 2i through which the fixing bolts 80 pass is integrally formed on the front surface of the second flange portion 2d2. The plate-shaped portion 2i is provided to fix the lid member 2b to the reel body 2a by means of the fixing bolts 80. The plate-shaped portion 2i is formed to protrude frontward from the outside of an approximately C-shaped seal mounting portion 2h to which a seal member 25 is mounted. The plate-shaped portion 2i is a vertically long portion, and a pair of through holes 2k through which the fixing bolts 80 pass are formed on the both ends thereof. In the plate-shaped portion 2i, an area formed between the through holes 2k is configured to have smaller amount of protrusion than areas in which the through holes 2k are formed. In other words, the plate-shaped portion 2i is formed such that the both ends thereof are formed to protrude in a substantially semi-circular shape with the same thickness and the area formed between the both ends is formed to protrude from the second flange portion 2d2 to be slightly dented backward compared to the center of the through holes 2k.

The seal member 25 is a C-shaped member made of a synthetic resin, and is provided to seal a portion dividing the flange into the lid member 2b and the reel body 2a. A switching member 56 to be described is detachably/reattachably mounted to the portion dividing the reel body 2a and the lid member 2b.

A recess 2g is formed in a portion of the cylindrical portion 2e on which the mounting groove 2f is formed, and the plate-shaped portion 2i is disposed in the recess 2g. A projection member 81 is mounted to the recess 2g so as to prevent the braking member 58 from being dented. The recess 2g is formed to be dented so as to fit the outline of the plate-shaped portion 2i. It is also formed to be dented in a substantially semicircular shape such that the both ends in a vertical direction protrude frontward compared to the intermediate portion between the both ends. The plate-shaped portion 2i is fixed to the recess 2g of the reel body 2a by means of the two fixing bolts 80. Accordingly, threaded holes 2m into which the fixing bolts 80 are screwed are formed in the recess 2g to be disposed in a predetermined spaced relationship in the vertical direction.

As illustrated in FIG. 3, the reel unit protection member 26 is a member that is mounted from backward so as to cover the reel body 2a and the lid member 2b. Specifically, the reel unit protection member 26 is mounted to a slanted portion 2n that is formed on the rear portion of both the reel body 2a including the rod attachment leg 2c and the lid member 2b through a packing 26b for suitably fitting these members. The reel unit protection member 26 includes a rod-shaped boss 26a that is fastened by the first screw member 28. The boss 26a is formed to penetrate the first insertion hole 2q from the back side of the reel body 2a and protrude toward the accommodation space RA.

The tip of the boss 26a protrudes so as to pass through the rear portion of the reel body 2a and face the retaining member 27. The tip of the boss 26a is fixed to the rear end portion of the retaining member 27 by the first screw member 28. In response to this configuration, a threaded hole 26d in which a female threaded portion is formed is preliminarily formed in the tip of the boss 26a. The reel unit protection member 26 is fixed to the retaining member 27 by the first screw member 28 while the retaining member 27 is non-movably mounted to the reel body 2a. Thus, the reel unit protection member 26 is fixed to the reel body 2a.

Figure 4:
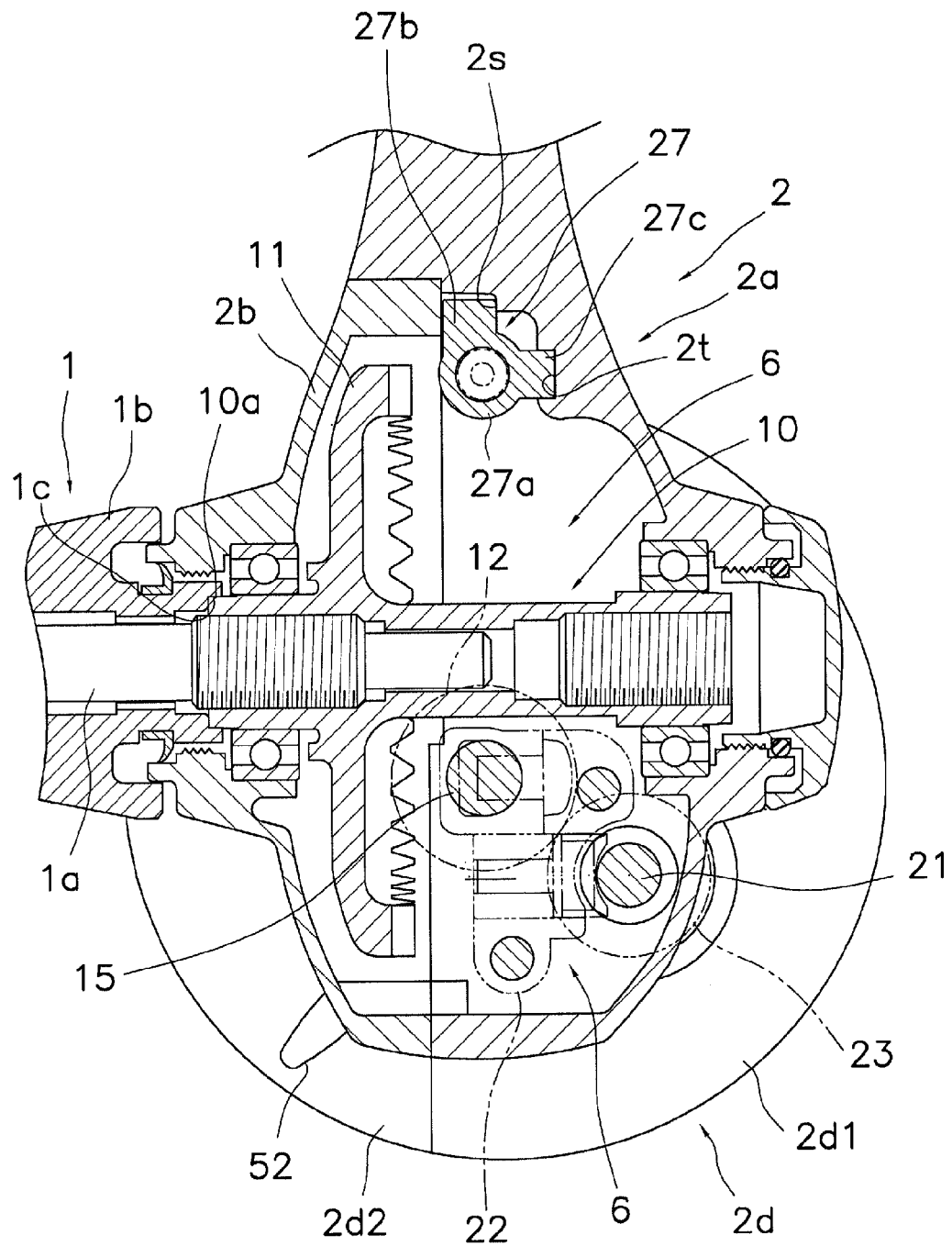
FIG. 4 is a cross-sectional view taken along line IV-IV of FIG. 2.

As illustrated in FIGS. 4 and 6, the retaining member 27 includes a tubular retaining body 27a, a restricting portion 27b that protrudes outward from the outer peripheral surface of the retaining body 27a, and a pair of interlocking portions 27c (an example of the first interlocking portion) that protrude in a direction perpendicular to the restricting portion formed on the outer peripheral surface of the retaining body 27a. A circular-shaped head portion accommodation portion 27d and a through hole 27e are formed on the inner peripheral surface of the retaining body 27a. The head portion accommodation portion 27d is capable of accommodating the head portion 28a of the first screw member 28, and the through hole 27e has a diameter smaller than that of the head portion accommodation portion 28d. The head portion accommodation portion 27d and the through hole 27e are formed to be concentrically disposed with the first and second insertion holes 2q and 2j while the retaining member 27 is mounted to the reel body 2a. In addition, a slight gap (e.g., 1-5 mm gap) is configured to be formed between the front end surface of the boss 26a and the rear end portion of the retaining member 27 when the reel unit protection member 26 is mounted. With this configuration, when the reel unit protection member 26 is mounted to the reel body 2a by the first screw member 28, the reel unit protection member 26 is further pulled to the reel body 2a side by a gap, and is slightly elastically deformed through the packing 26b, while the rim of the reel unit protection member 26 makes contact with the slanted portion 2n. Thus the reel unit protection member 26 is mounted to the reel body 2a without any gap.

The inner diameter of the head portion accommodation portion 27d is configured such that the head portion accommodation portion 27d is allowed to engage with the head portion 28a of the first screw member 28 through a slight gap and accommodate the head portion 28a. The through hole 27e has an inner diameter that is the same as or slightly smaller than the maximum diameter of the shaft portion 28b of the first screw member 28 so as to be capable of retaining the shaft portion 28b. The restricting portion 27b is formed in an approximately rectangular shape to protrude from a position not aligned with the center of the outer peripheral surface of the retaining body 27a. As illustrated in FIG. 4, the restricting portion 27b is interposed and supported between a stepped portion 2s formed on a sidewall surface of the reel body 2a and an edge surface of the lid member 2b, and is restricted from moving in a direction perpendicular to the spool shaft 15. As illustrated in FIG. 5, the interlocking portions 27c are formed in a rod shape to protrude in a diameter direction, and are disposed to be spaced apart in an axis direction of the first screw member 28. As illustrated in FIG. 4, the interlocking portions 27c are engaged with an interlocked portion 2t (an example of the first interlocked portion) that is formed on a side wall of the reel body 2a. With this configuration, it is possible to provide the retaining member 27 in the accommodation space RA so as to be non-movable with respect to the reel body 2a. As illustrated by a two-dot chain line in FIG. 6, when the reel unit 2 is assembled, the tip of the shaft portion 28b of the first screw member 28 is retained by the through hole 27e such that the shaft portion 28b does not protrude from the through hole 27e.

According to the reel unit 2, the fixing bolt 82 for fixing the lid member 2b to the reel body 2a is covered with the reel unit protection member 26, and the fixing bolts 80 are covered with the rotor 3. Therefore, such bolt members are invisible from the outside. In addition, the first screw member 28 for attaching the reel unit protection member 26 is also covered with the cap 39. Therefore, it is possible to form the reel unit in a simple appearance without exposing all the bolt members to the outside.

In addition, the reel unit protection member 26 is allowed to be fixed when the retaining member 27 retaining the first screw member 28 is disposed in the accommodation space RA so as to be non-movable with respect to the reel body 2a and the retained screw member 28 is fixed to the tip of the boss 26a by a tool from outside. Therefore, it is possible to use a short screw member 28. Accordingly, it is possible to easily fix the reel unit protection member 26, and it is also possible to prevent the first screw member 28 from being exposed to the rear portion of the reel unit 2.

<Configuration of Other Units/Members of Spinning Reel>

As illustrated in FIGS. 2 and 4, the rotor driving mechanism 5 includes a face gear 11 that rotates together with a master gear shaft 10 to which the handle 1 is fixed, and a pinion gear 12 that meshes with the face gear 11. The pinion gear 12 is formed in a tubular shape, and the front portion thereof passes through the center portion of the rotor 3 and is fixed to the rotor 3 by a nut 13. In addition, the intermediate portion and the rear end portion of the pinion gear 12 in its axial direction are rotatably supported by the reel unit 2 through bearings 14a and 14b, respectively.

As illustrated in FIG. 4, the face gear 11 is integrally formed with or separately formed from the master gear shaft 10 (in this embodiment, the face gear 11 is integrally formed with the master gear shaft 10). A male coupling portion 10a is formed on the outer peripheral surface of the both tips of the master gear shaft 10 so as to have a diameter smaller than that of the other portions of the master gear shaft 10. The male coupling portion 10a is coupled to a shaft brim portion 1b that is disposed on the outer peripheral side of a handle shaft 1a of the handle 1 by spigot coupling. In addition, a female coupling portion 1c to be engaged with the outer peripheral surface of the coupling recess is formed on the inner peripheral surface of the shaft brim portion 1b. With this configuration, the shaft brim portion 1b is concentrically disposed with the master gear shaft 10, and the shaft brim portion 1b is prevented from wobbling.

As illustrated in FIGS. 2 and 4, the oscillating mechanism 6 is a mechanism for moving the spool 4 in a front-to-rear direction by moving a spool shaft 15 coupled to the center of the spool 4 via a drag mechanism 60 in the front-to-rear direction. The oscillating mechanism 6 includes a worm shaft 21 disposed below the spool shaft 15 to be parallel to the spool shaft 15, a slider 22 that moves along the warm shaft 21 in a front-to-rear direction, and an intermediate gear 23 that is fixed to the tip of the worm shaft 21. The rear end of the spool shaft 15 is non-rotatably fixed to the slider 22. The intermediate gear 23 meshes with the pinion gear 12.

Figure 8:
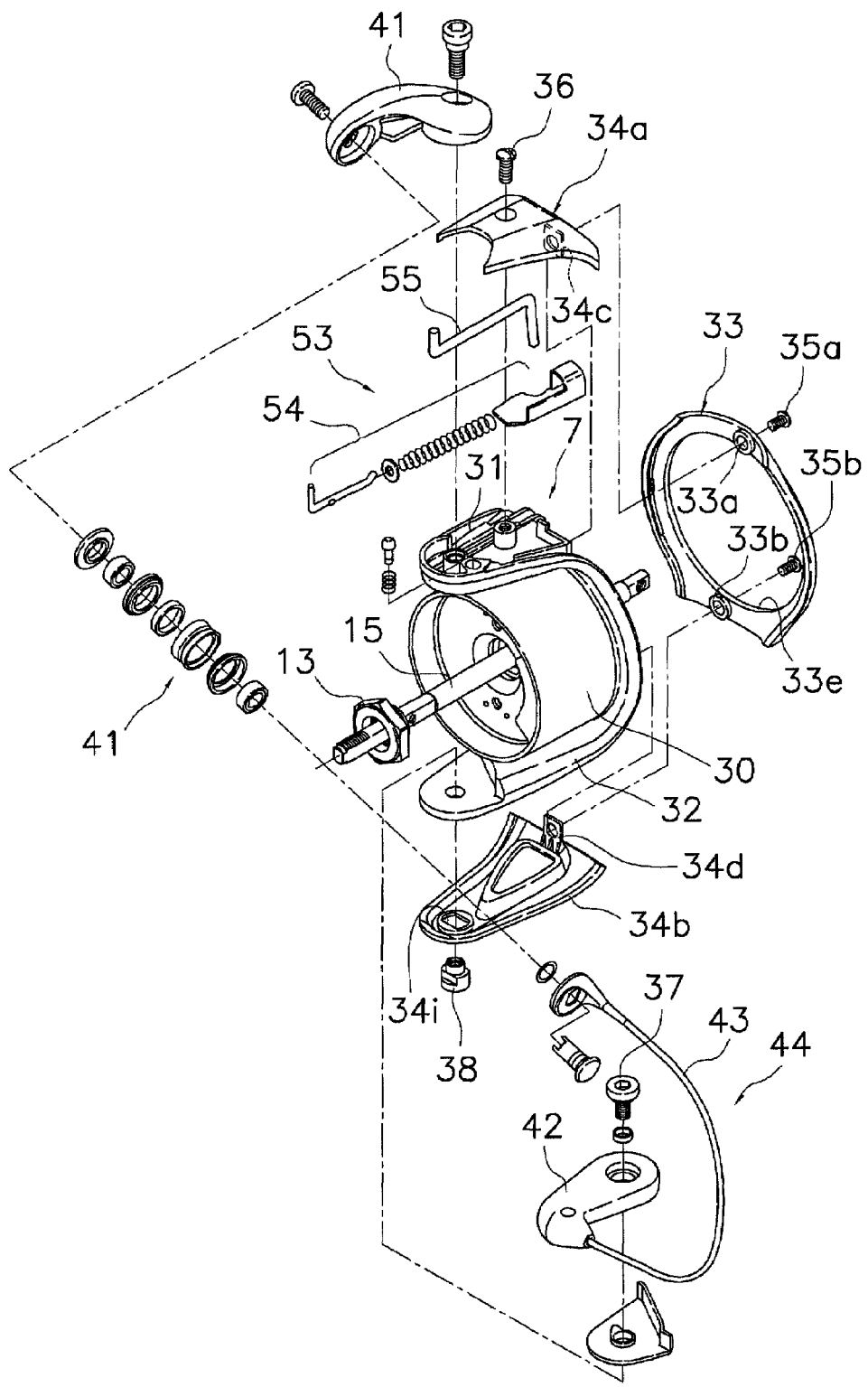
FIG. 8 is an exploded perspective view of the rotor.
Figure 9:
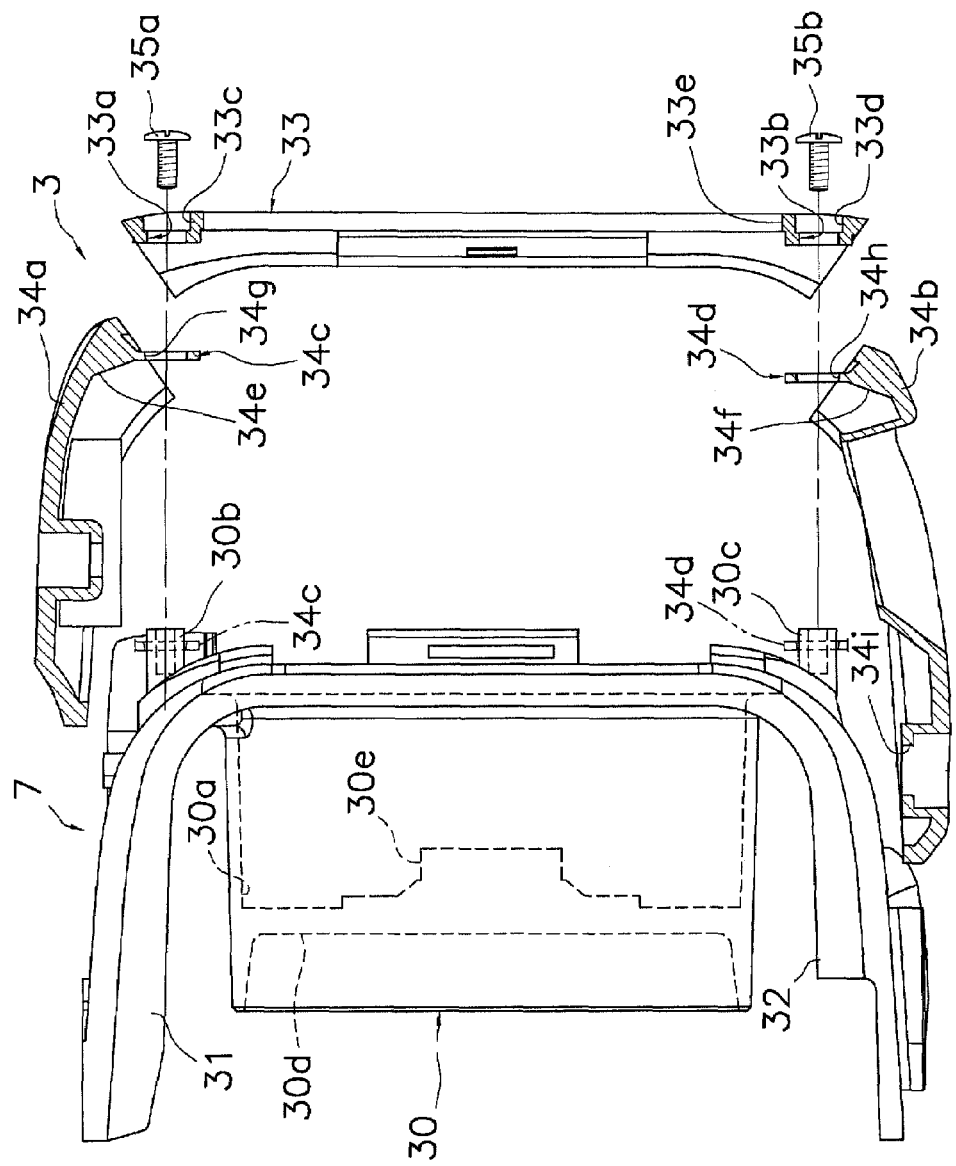
FIG. 9 is an exploded side view of the rotor.

As illustrated in FIGS. 2, 8, and 9, the rotor 3 includes a rotor body 7 that is disposed in the reel unit 2 so as to be capable of rotating around a first axis X in a front-to-rear direction, a rear cover member 33 that covers the rear portion of the rotor body 7, and a pair of second cover members 34a and 34b that cover the outer surface of first and second rotor arms 31 and 32.

The rotor body 7 is made of a light alloy such as a magnesium alloy and an aluminum alloy. The rotor body 7 is non-rotatably coupled to the pinion gear 12, but it is rotatably supported by the reel unit 2. The rotor body 7 includes a tubular member 30, and the first and second rotor arms 31 and 32. Here, the tubular member 30 includes a hollow portion 30a in its rear portion so as to accommodate the cylindrical portion 2e, which is a front portion of the reel unit 2, in the interior of the hollow portion 30a. The first and second rotor arms 31 and 32 are connected to opposed positions in the rear portion of the tubular member 30 and extend forward from the connection positions while they are spaced apart from the tubular member 30.

The tubular member 30 includes a disk-shaped wall portion 30d in an inner peripheral side of its front portion, and an annular boss 30e is formed in the center of the wall portion 30d. Here, the boss 30e is coupled to the pinion gear 12 so as to be allowed to integrally rotate with it. The front portion of the pinion gear 12 is non-rotatably interlocked with the center of the boss 30e, and the rotor body 7 is fixed to the pinion gear 12 by fastening the nut 13 into the tip of the pinion gear 12.

In addition, as illustrated in FIG. 9, the rotor 3 further includes tubular bosses 30b and 30c, brackets 34c and 34d, and fixing bolts 35a and 35b. The tubular bosses 30b and 30c are provided in the rotor 7 such that they are disposed outside of the hollow portion 30a in a diameter direction and are arranged to be parallel to the first axis X at a predetermined interval in a peripheral direction of the rotor body 7. The brackets 34c and 34d are interlocked with the pair of bosses 30b and 30c so that they are allowed to move in a protruding direction of the bosses 30b and 30c (i.e., front-to-rear direction) and are not allowed to move in a perpendicular direction to the protruding direction (i.e., diameter direction of the rotor 3). The fixing bolts 35a and 35b fix the rear cover member 33 to the rotor body 7. The bosses 30b and 30c are formed to protrude backward form the back surface of the rotor body 7. The brackets 34c and 34d are provided in the pair of outer cover members 34a and 34b and protrude inward. The fixing bolts 35a and 35b are screwed into the bosses 30b and 30c, and couples the rear cover member 33 to the rotor body 7 while the brackets 34c and 34d are interlocked with the pair of bosses 30b and 30c.

The rear cover member 33 is configured to cover the rear portion of the rotor body 7 around the hollow portion 30a. Through holes 33a and 33b through which the fixing bolts 35a and 35b pass are formed in the rear cover member 33 so as to be opposed to the bosses 30b and 30c. The fixing bolts 35a and 35b are disposed along an axial direction parallel to the first axis X. Therefore, the through holes 33a and 33b are also formed to be arranged in the same direction. The through holes 33a and 33b include stepped portions 33c and 33d, respectively, in which head portions of the fixing bolts 35a and 35b are respectively accommodated. Accordingly, the head portions of the fixing bolts 35a and 35b do not protrude backward. In addition, a circular opening 33e is formed in the rear cover member 33 so as to be separated apart from the flange 2d of the reel unit 2 through a slight gap of approximately 0.5 to 1.5 mm.

The outer cover member 34a covers the outside of the first rotor arm 31, and is coupled to the first rotor arm 31 by fastening a fixing bolt 36 into the first rotor arm 31. The outer cover member 34a is joined to the rear cover member 33 and the first rotor arm 31 and thus these members form a three-dimensionally curved shape. Because of this configuration, even if the outer cover member 34a is slightly misaligned in a forward or backward direction, a step may be formed between the outer cover member 34a and the first rotor arm 31 and between the outer cover member 34a and the rear cover member 33. The bracket 34c provided in the outer cover member 34a is an approximately rectangular plate-shaped member, and its base end side is reinforced by a plurality of ribs 34e. A through hole 34g is formed in the front end side of the bracket 34c, and the boss 30b passes through and is engaged with the through hole 34g. Because of the configuration, the bracket 34c is interlocked with the boss 30b such that it is allowed to move in a protrusion direction of the boss 30b (i.e., front-to-rear direction) but not to move in a perpendicular direction to the protrusion direction (i.e., diameter direction of the rotor 3). The front end portion of the outer cover member 34a is cut out in an approximately semicircular shape such that a first bail support member 40 to be described is allowed to be disposed therein.

The outer cover member 34b covers the outside of the second rotor arm 32, and is fixed to the second rotor arm 32 by the fixing bolt 37 and a nut member 38 that is screwed onto the fixing bolt 37. The outer cover member 34b is joined to the rear cover member 33 and the second rotor arm 32 and thus these members also form a three-dimensionally curved shape. Because of the configuration, even if the outer cover member 34b is slightly misaligned in a forward or backward direction, a step may be formed between the outer cover member 34b and the second rotor arm 32 and between the outer cover member 34b and the rear cover member 33. The bracket 34d provided in the outer cover member 34b is approximately the same as the bracket 34c that is formed in an approximately rectangular plate shape, and its base end side is reinforced by a plurality of ribs 34f. A through hole 34h is formed in the front end side of the bracket 34d, and the boss 30c passes through and is engaged with the through hole 34h. Because of the configuration, as well as the bracket 34c, the bracket 34d is interlocked with the boss 30c so as to be allowed to move in a protrusion direction of the boss 30c (i.e., front-to-rear direction) but not to move in a perpendicular direction to the protrusion direction (i.e., diameter direction of the rotor 3). An interlocking hole 34i is formed in the tip of the outer cover member 34b so as to non-rotatably interlock the nut member 38 that is screwed onto the fixing bolt 37. The fixing bolt 37 fixes the outer cover member 34b to the rotor body 7, and also has a function of supporting a second bail support member 42 to be described such that the second bail support member 42 is allowed to swing.

Here, the bosses 30b and 30c pass through the brackets 34c and 34d, and the outer cover member 34a and 34b are allowed to move in a front-to-rear direction but are restricted to move only in the diameter direction. Therefore, when members including the rear cover member 33 are fixed to the rotor body 7, it is possible to reduce a step that may be formed among cover members 33, 34a and 34b and a step that may be formed among the rotor body 7 and the cover members 33, 34a and 34b to a maximum extent without increasing processing accuracy.

Specifically, when the rotor 3 is assembled while a bail flipping mechanism 53 and the like are accommodated therein, the bosses 30b and 30c are inserted into the through holes 34g and 34h formed in the brackets 34c and 34d, and the brackets 34c and 34d are interlocked with the bosses 30b and 30c. While this state is maintained, the outer cover members 34a and 34b are mounted to the rotor body 7, and then the rear cover member 33 is mounted to the rotor body 7 from its back side. Next, the outer cover members 34a and 34b are fixed to the suitable positions in the rotor body 7 by the fixing bolts 36 and 37, which is performed by moving the outer cover members 34a and 34b in a front-to-rear direction such that steps between the rotor body 7 and the outer cover members 34a and 34b are reduced to a maximum extent. Then, the rear cover member 33 is fixed to the rotor body 7 by inserting the fixing bolts 35a and 35b into the through holes 33a and 33b and then fastening them into the bosses 30b and 30c. Here, when steps are formed between the rotor body 7 and the outer cover members 34a and 34b, it is possible to adjust the positions of the outer cover members 34a and 34b in a front-to-rear direction by slightly loosening the fixing bolts 36 and 37.

In addition, the bosses 30b and 30c are interlocked with the brackets 34c and 34d protruding inward, and thus the rear cover member 33 and the outer cover members 34a and 34b are fixed to the rotor body 7 by the fixing bolts 35a and 35b. It is not necessary to form a through hole in proximity to corner portions of the outer cover members 34a and 34b. Therefore, even when the outer cover members 34a and 34b are fixed to the rotor body 7, the rotor body 7 is not easily ruptured and foreign substances are not easily attached to it.

The first bail support member 40 is mounted to the outer peripheral side of the tip of the first rotor arm 31 so as to be allowed to swing. A line roller 41 for guiding fishing line to the spool 4 is mounted to the tip of the first bail support member 40. In addition, the second bail support member 42 is mounted to an inner peripheral side of the tip of the second rotor arm 32 so as to be allowed to swing.

A bail 43 is a wire member that is bent into an approximately U-shape, and is fixed between the line roller 41 and the second bail support member 42. A bail arm 44 that guides fishing line onto the spool 4 is composed of the first bail support member 40, the second bail support member 42, the line roller 41 and the bail 43. The bail arm 44 is allowed to swing between a line-guiding posture illustrated in FIG. 2 and a line-releasing posture that flips from the line-guiding posture.

As illustrated in FIG. 2, an anti-reverse rotation mechanism 50 for prohibiting and allowing reverse rotation of the rotor 3 is disposed in the interior of the tubular member 30 of the rotor 3. The anti-reverse rotation mechanism 50 includes a roller-type one-way clutch 51 with a freely rotating inner ring, and a switching mechanism 52 that switches the one-way clutch 51 between an operating state (i.e., state in which reverse rotation is prohibited) and a non-operating state (i.e., state in which reverse rotation is allowed). The switching mechanism 52 includes a switching lever 52a that is pivotably mounted to the reel body 2a. As illustrated in FIG. 1, the switching lever 52a is fixed to a pivot shaft 52b that penetrates the base end portion of the switching lever 52a by a fixing bolt 52c. A rotation cam (not illustrated in Figures) is fixed to the tip of the pivot shaft 52b. When the switching lever 52a is pressed, the one-way crutch 51 is switched between the operational condition and the non-operational condition by the cam. The fixing bolt 52c is disposed in a position that is hidden by the lid member 2b. With this configuration, the fixing bolt 52c is prevented from being exposed to the outside and will be unnoticeable.

The bail flipping mechanism 53 is accommodated in the interior of the outer cover member 34b, and restores the bail arm 44 from the line-releasing posture to the line-winding posture in association with the rotation of the handle 1 in the line-winding direction. The bail flipping mechanism 53 includes a toggle spring mechanism 54, a moving member 55, and the above described switching member 56. Here, the toggle spring mechanism 54 urges the bail arm 44 to the line-releasing posture or the line-winding posture when the dead point as the switching timing is exceeded. The moving member 55 moves in a front-to-end direction in association with swing of the bail arm 44. The front ends of the toggle spring mechanism 54 and the moving member 55 are interlocked with the lower surface of the first bail support member 40. When the rotor 3 rotates in the line-winding direction, the rear end of the moving member 55 makes contact with and moves onto the switching member 56, and then moves forward. Accordingly, the bail arm 44 is restored to the line-winding posture. In addition, the moving member 55 also forms a part of the rotor braking mechanism 57. In the line-releasing posture, the moving member 55 engages with the braking member 58, and thus brakes the rotor 3 not to rotate. As illustrated in FIG. 3, the braking member 58 is an annular elastic member on which a plurality of recesses 58a are formed at a predetermined spacing in the peripheral direction, and frictionally engages with the mounting groove 2f. Here, the recesses 58a engage with the front end of the moving member 55.

Figure 10:
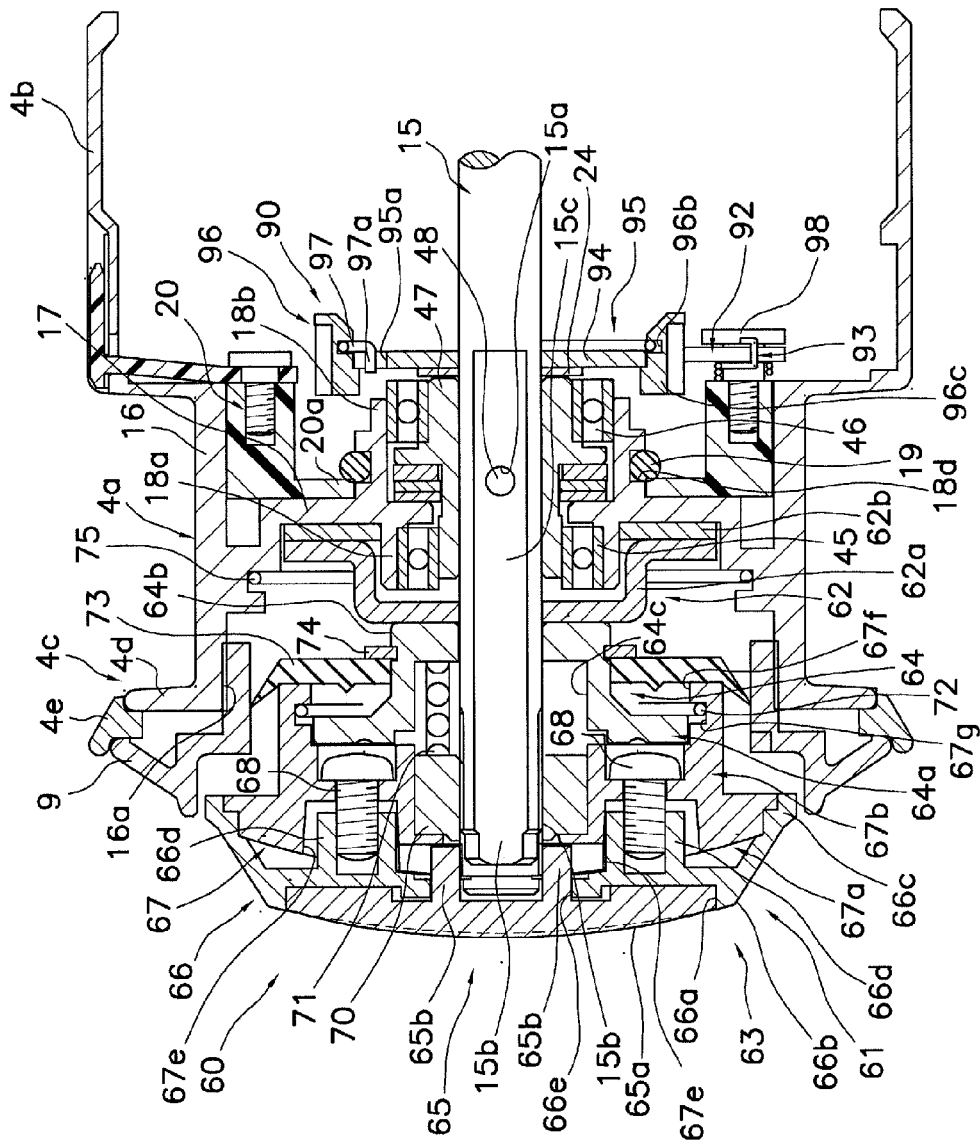
FIG. 10 is an enlarged cross-sectional view of the spool.

As illustrated in FIG. 2, the spool 4 is disposed between the first rotor arm 31 and the second rotor arm 32 of the rotor 3, and is mounted to the tip of the spool shaft 15 through the drag mechanism 60. As illustrated in FIG. 10, the spool 4 includes a bobbin trunk 4a, a tubular skirt portion 4b, and a large-diameter flange portion 4c. Here, fishing line is wound around the outer periphery of the bobbin trunk 4a. The skirt portion 4b is integrally formed with the bobbin trunk 4a so as to be disposed in the rear side of the bobbin trunk 4a. The flange portion 4c is disposed in the front end of the bobbin trunk 4a. The flange portion 4c includes an inner flange portion 4d and an outer flange portion 4e. Here, the inner flange portion 4d is integrally formed with the bobbin trunk 4a. The outer flange portion 4e is a ring-shaped member made of toughened ceramic, for instance, and is detachably/reattachably mounted to the outer peripheral side of the inner flange portion 4d. The outer flange portion 4e is fixed to the inner flange portion 4d by a flange fixing member 9.

As illustrated in FIG. 10, the bobbin trunk 4a, the skirt portion 4b, and the inner flange portion 4d forms a double-tiered cylindrical member including big and small tiers, and are integrally formed by means of forging of an aluminum ally. The double-tired cylindrical member is rotatably mounted to the spool shaft 15 with first and second bearings 45 and 46.

The bobbin trunk 4a includes a cylindrical portion 16, a disk portion 17, and support portions 18a and 18b. Here, fishing line is wound around the cylindrical portion 16. The disk portion 17 is formed in the inner peripheral side of the cylindrical portion 16 so as to have a step. The support portions 18a and 18b are closed-ended cylindrical members that are formed to protrude frontward and backward on the inner peripheral side. A female threaded portion 16a is formed in the front portion of the cylindrical portion 16, and the flange fixing member 9 is fastened into the female threaded portion 16a. The first and second bearings 45 and 46 are mounted in the inner side of the support portions 18a and 18b, respectively, and are also mounted to the spool shaft 15 through a tubular retaining member 47. The sound producing mechanism 90, which produces sounds when the spool 4 and the spool shaft 15 are relatively rotated, is disposed to backward of the bobbin trunk 4*a*.

Figure 12:
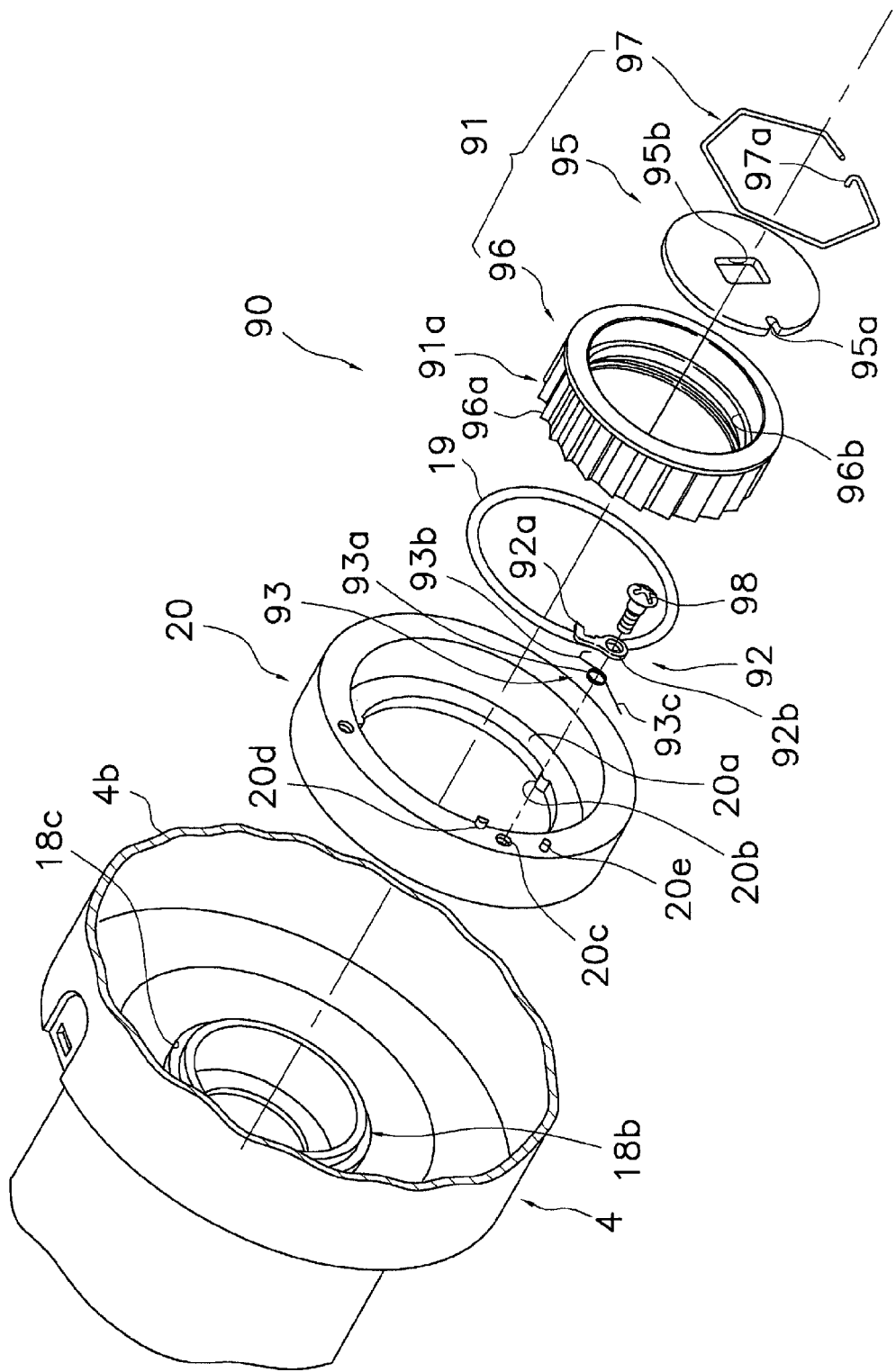
FIG. 12 is an exploded perspective view around the sound producing mechanism.

The spool 4 further includes an annular attachment member 20 that is mounted to the outer peripheral surface of the support portion 18*b* and the sound producing mechanism 90 is mounted thereto. The attachment member 20 is a synthetic resin annular member that is concentrically disposed with the spool shaft 15, and includes an inner flange portion 20*a* making contact with the rear surface of the disk portion 17 on the front end thereof. The inner peripheral portion of the inner flange portion 20*a* is engaged with the outer peripheral surface of the support portion 18*b*. An O-ring 19 for retaining the attachment member 20 is mounted to the outer peripheral surface of the support portion 18*b*. The O-ring 19 is mounted to an annular attachment groove 18*d* that is formed in the support portion 18*b*. The front-side wall portion of the attachment groove 18*d* is disposed backward from the position of the back-side wall portion of the inner flange portion 20 of the attachment member 20. It contacts with the rear surface of the inner flange portion 20*a* of the attachment member 20 while it is elastically deformed. Also, as illustrated in FIG. 12, a plurality of (e.g., three) circular-arc shaped interlocking hollows 18*c* are formed on the outer peripheral surface of the support portion 18*b* to be unequally spaced apart in the peripheral direction. A plurality of (e.g., three) circular-arc shaped interlocking protrusions 20*b*, which are engaged with the interlocking hollows 18*c*, are formed on the inner peripheral surface of the inner flange portion 20*a* of the attachment member 20 to be unequally spaced apart in the peripheral direction. When the interlocking protrusions 20*b* are engaged with the interlocking hollows 18*c*, it is possible to position the attachment member 20 with respect to the support portion 18*b* and also possible to prevent rotation of the attachment member 20 in the peripheral direction with respect to the support portion 18*b*.

The retaining member 47 is a tubular member that the rear end portion thereof makes contact with the sound producing mechanism 90 through the washer 24 and is pressed backward by the disk portion 17. The retaining member 47 is non-rotatably coupled to the spool shaft 15 by means of a pin member 48 such as a hexagon socket screw that is screwed into a female threaded portion 15*a* formed to penetrate the spool shaft 15 in a diameter direction.

The drag mechanism 60 brakes rotation of the spool 4, and includes a drag adjustment knob 61 that is screwed onto the tip of the spool shaft 15, and a braking member 62 that brakes the spool 4 when it is pressed by the drag adjustment knob 61.

Figure 11:
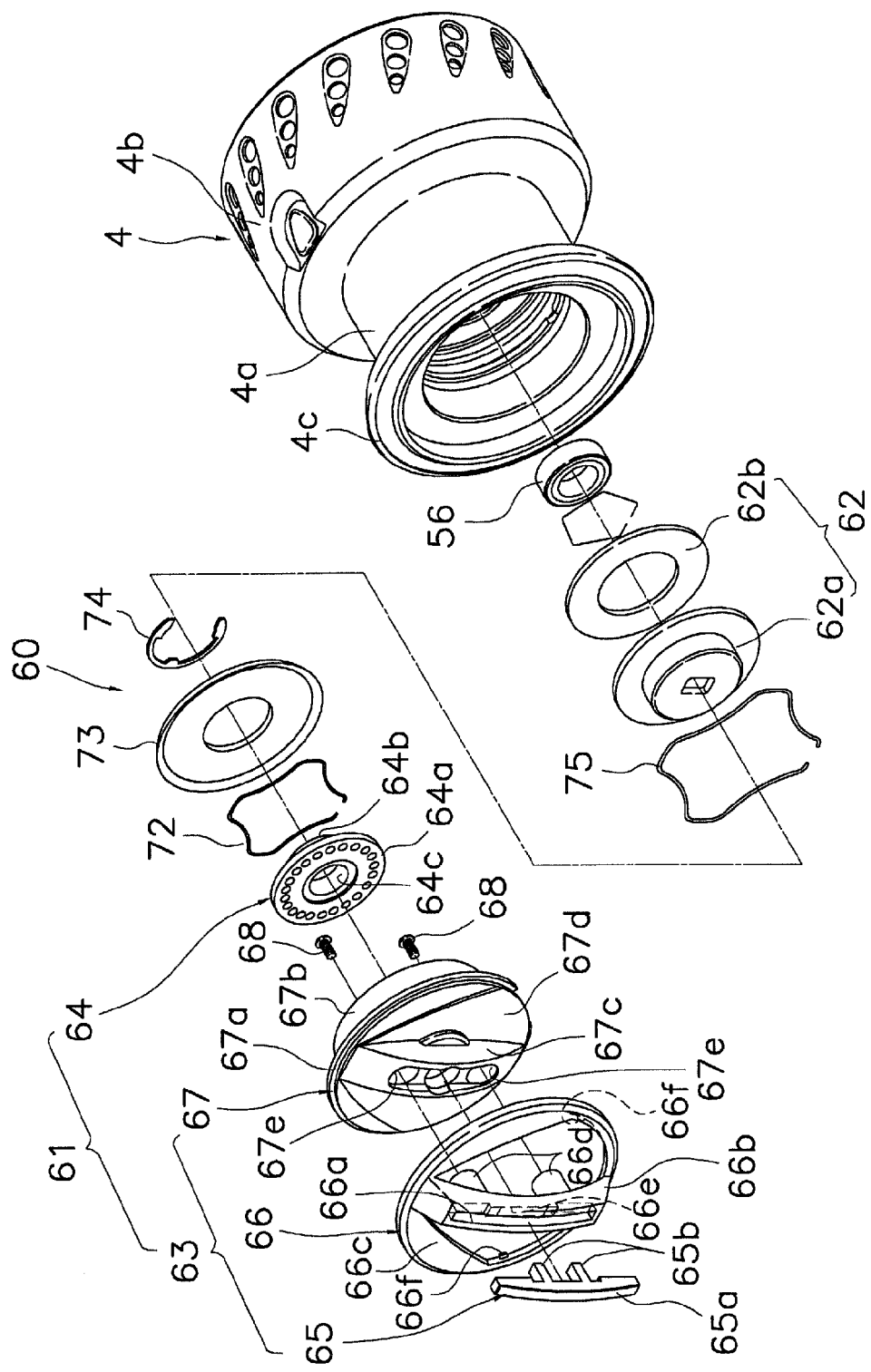
FIG. 11 is an exploded perspective view of the spool.

As illustrated in FIGS. 10 and 11, the drag adjustment knob 61 includes a circular knob member 63 that is screwed onto the spool shaft 15, a knob clasp 65 that is fixed to the knob member 63, and a pressing member 64 that is allowed to relatively rotate with the knob member 63 and is pressed by the knob member 63.

A slit 66*a* is formed in the central portion of the knob member 63 along a diameter direction. The knob member 63 includes a knob cover 66 and a knob body 67. The knob cover 66 has a knob operation portion 66*b* that protrudes to a perpendicular direction (leftward in FIG. 10) to the direction in which the slit 66*a* is formed. The knob body 67 is screwed onto the spool shaft 15 and the knob cover 66 is fixed to the knob body 67.

The knob cover 66 is fixed to the knob body 67 by two fixing screws 68. The knob cover 66 is a synthetic resin member, for instance, and is provided to give design variation to the drag adjustment knob 61 by covering a portion of the front surface of the knob body 67. The knob cover 66 includes an approximately triangle shaped opening around the knob operation portion 66*b*, and the knob body 67 is exposed through the opening. The knob cover 66 further includes a cover portion 66*c* covering both the outer peripheral surface of the knob body 67 and the outer peripheral side of the front surface, and a pair of round bar shaped bosses 66*d* extending backward from the knob operation portion 66*b*. The fixing screws 68 are screwed into the pair of bosses 66*d*, and thus the knob cover 66 is fixed to the knob body 67. The front end surface of the knob operation portion 66*b* of the knob cover 66 protrudes in a circular arc shape, and the slit 66*a* is formed in the center position of the knob operation portion 66*b*. The slit 66*a* is formed along the diameter direction of the spool shaft 15 and the knob clasp 65 is mounted to the slit 66*a*. A rectangular shaped through hole 66*e* is formed on the bottom of the slit 66*a*, and legs 65*b* of the knob clasp 65 to be described pass through the through hole 66*e*. In addition, a pair of interlocking protrusions 66*f* is provided in a thin portion of the opening formed in the knob cover 66 for the purpose of preventing comber and uplift of the thin portion. The interlocking protrusions 66*f* are interlocked with the rear surface of the knob body 67.

The knob body 67 is a synthetic resin member, for instance, and forms a major part of the drag adjustment knob 61. The knob body 67 includes a disk portion 67*a* that is covered with the knob cover 66, a tubular portion 67*b* that is integrally formed with the rear portion of the disk portion 67*a*, and a nut member 70 that is mounted to the interior of the tubular portion 67*b*. The disk portion 67*a* includes a protruding portion 67*c* that is formed on the front surface thereof so as to be disposed behind the knob operation portion 66*b*, and an exposure portion 67*d* that is exposed through the opening formed in the cover portion 66*c* of the knob cover 66. Through holes 67*e* through which the bosses 66*d* pass are formed in the protruding portion 67*c*. The through holes 67*e* are formed in an oval shape, and are also obliquely formed such that both ends of the longer diameter of the oval expand forward. With this configuration, the interlocking protrusions 66*f* for preventing uplift of the knob cover 66 are interlocked with the knob body 67, and thus the bosses 66*d* are easily passed through the through holes 67*e* even when the knob cover 66 is obliquely tilted. Accordingly, attachment/detachment of the knob cover 66 is easily performed even when the interlocking protrusions for preventing uplift of the knob cover 66 are provided. In addition, a portion of the exposure portion 67*d* surrounding the knob operation portion 66*b* is formed to be more dented in a circular-arc shape than the rim of the exposure portion 67*d*. This configuration makes it easy to operate the knob operation portion 66*b*.

A circular accommodation space 67*f* for accommodating the pressing member 64 is formed in the tubular portion 67*b*. A knob sound producing mechanism (not illustrated in the Figure) is disposed between the knob member 63 and the pressing member 64, and produces sounds when the drag adjustment knob 61 is turned. The nut member 70 is screwed onto a male threaded portion 15*b* formed in the tip of the spool shaft 15, and is mounted to the interior of the tubular portion 67*b* to be allowed to integrally rotate with the spool shaft 15 and move freely in the axial direction. A coil spring 71 for adjusting the drag force is compressibly disposed between the nut 70 and the pressing member 64.

The knob clasp 65 is provided to prevent the front end portion of the drag adjustment knob 61 from being damaged and to reinforce the knob operation portion 66*b*. For example, it is a plate member that is made of a metal such as an aluminum alloy and the surface thereof is anodized. The knob clasp 65 is uniformly formed in an approximately 1.2-1.8 mm thickness. The front surface of the knob clasp 65 (i.e., left side surface of FIG. 10) is formed to be curved in a circular-arc shape so as to fit the knob operation portion 66b of the knob cover 66. The knob clasp 65 includes a clasp body 65a disposed in the slit 66a, and a pair of legs 65b extending from the rear surface of the clasp body 65a toward the interior of the knob member 63. The front surface of the knob clasp 65a is disposed to slightly protrude from the knob operation portion 66b of the knob cover 66. However, curvature of the front surface of the clasp body 65a varies, and the both end portions of the front surface of the clasp body 65a in a direction that the slit 66a is disposed are disposed to be slightly recessed from the surface of the knob operation portion 66b. With this configuration, the knob clasp 65 is disposed not to protrude from the both ends of the slit 66a, and thus fishing line is not easily entwined around the knob clasp 65. The legs 65b are passed through the through holes 66e and plastic deformation is performed with respect to the tips of the legs 65b. Thus, the knob clasp 65 is fixed to the knob cover 66 by a caulking process.

It is possible to enhance the strength of the knob operation portion 66b by disposing this type of metal knob clasp 65 in the slit 66a. Accordingly, it is possible to enhance operability of the knob operation portion 66b by reducing the thickness of the knob operation portion 66b to a maximum extent. In addition, it is possible to prevent the knob operation portion 66b from being damaged because the knob clasp protrudes from the surface of the knob operation portion 66b. For example, the thickness of the knob operation portion 66b has been 7-9 mm in the conventional art, but it is possible to reduce the thickness of the knob operation portion 66b to about 6 mm in the present invention.

In addition, the knob member 63 is divided into the knob cover 66 and the knob body 67, and the knob clasp 65 is allowed to be mounted to the knob cover 66. Accordingly, it will be easy to attach the knob clasp 65 to the knob member 63. Also, it is possible to use different kinds of synthetic resins for the two members 66 and 67. For example, the cover member has chances to come into contact with the ground or the like. Accordingly, it may be made of an ABS resin or the like that has relatively strong shock resistance. On the other hand, the knob body is composed of functions. Accordingly, it may be made of a polyamide resin or the like by which accuracy and strength of the knob body is allowed to be relatively easily maintained. Thus, it is possible to provide the knob member 63 with sufficient accuracy and strength while it is protected from falling damage or the like.

The pressing member 64 is a cylindrical member with a brim, which is made of a synthetic resin, for instance, and includes a brim portion 64a and a cylindrical portion 64b. The brim portion 64a of the pressing member 64 is disposed in the accommodation space 67f. The brim portion 64a is coupled to the knob body 67 while it is retained by a retaining spring 72 mounted to an annular groove 67g of the accommodation space 67f so as to be allowed to relatively rotate with the knob body 67. A circular spring accommodation portion 64c is formed in the cylindrical portion 64b, and a coil spring 71 makes contact with the spring accommodation portion 64c. A seal member 73 is mounted to the outer peripheral surface of the cylindrical portion 64b, and prevents liquids from entering the braking member 62. The seal member 73 is retained by an E-shaped retaining ring 74, and the outer peripheral surface of the seal member 73 makes contact with the inner peripheral surface of the flange fixing member 9.

The braking member 62 includes a plurality of (e.g., two) drag washers 62a and 62b that are accommodated in the interior of the bobbin trunk 4a. The drag washer 62a makes contact with and is pressed to the pressing member 64. The drag washer 62a is a metal disk shaped member, for instance. In addition, the drag washer 62a is engaged with the chamfered portions 15c that are formed to be parallel to each other in the tip of the spool shaft 15, and it is not allowed to rotate with respect to the spool shaft 15. The drag washer 62b is a disk member made of graphite or felt, for instance. The drag washer 62b is allowed to freely rotate with respect to the spool 4 and the pool shaft 15. These drag washers 62a and 62b are retained by a retaining spring 75 that is mounted to the interior of the bobbin trunk 4a.

Figure 13:
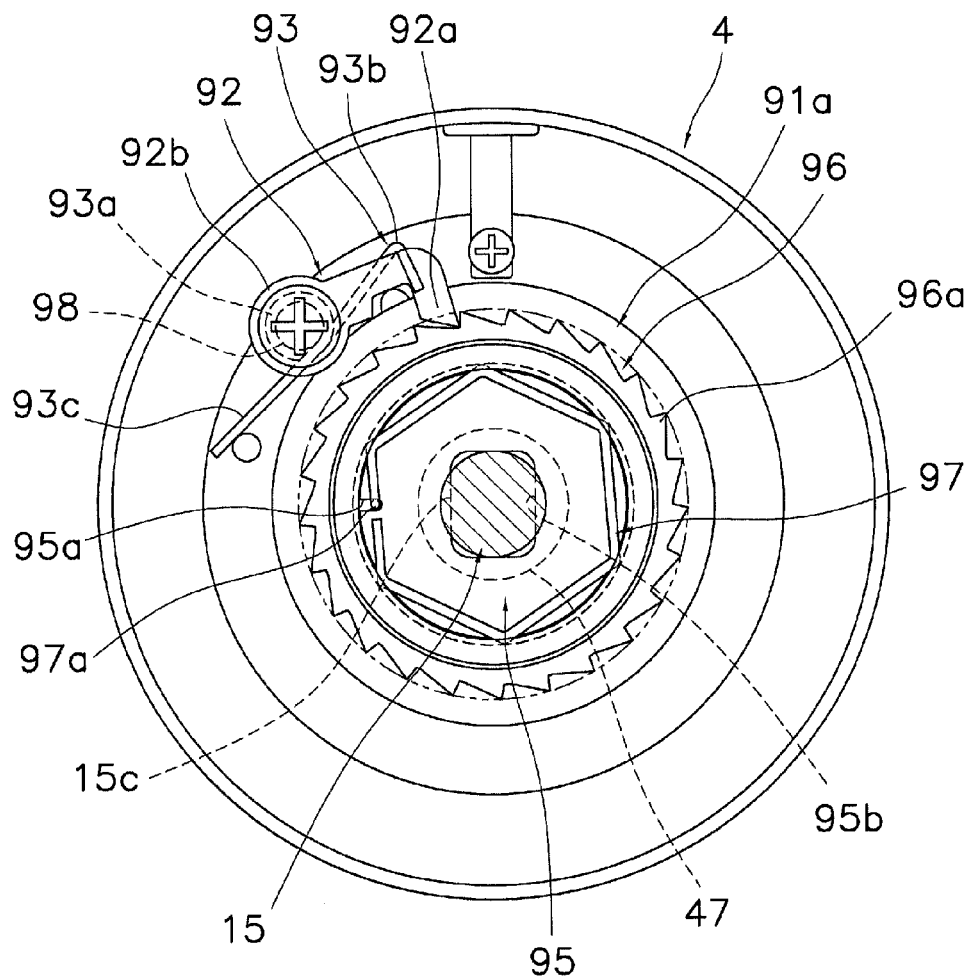
FIG. 13 is a front view of the sound producing mechanism.

As illustrated in FIGS. 10, 12, and 13, the sound producing mechanism 90 includes a sound producing member 91, a hitting member 92, and an urging member 93. The sound producing member 91 is non-rotatably mounted to the spool shaft 15 and includes a concave-convex portion 91a for producing sounds on the outer periphery thereof. The hitting member 92 is mounted to the spool 4 so as to relatively rotate with the spool 4, and produces sounds by repeatedly making contact with the concave-convex portion 91a when the spool 4 rotates in the line-releasing direction. The urging member 93 urges the hitting member 92 toward the sound producing member 91.

The sound producing member 91 includes a disk member 95, an annular member 96, and a rotation restricting member 97. The disk member 95 is non-rotatably mounted to the spool shaft 15. The annular member 96 is rotatably mounted to the outer peripheral side of the disk member 95. The rotation restricting member 97 is disposed between the disk member 95 and the annular member 96, and restricts rotation of the annular member 96.

The disk member 95 is a metal ring member that is non-rotatably mounted to the spool shaft 15 while backward movement thereof is restricted by a step formed between the chamfered portion 15c and the circular portion of the spool shaft 15. The disk member 95 includes a cutout 95a formed by cutting out a portion of the outer periphery thereof, and a non-circular hole 95b formed to be in a non-circular shape in the inner peripheral side thereof. An interlocking portion 97a of the rotation restriction member 97 is interlocked with the cutout portion 95a. The non-circular hole 95b is formed so that the chamfered portions 15c are allowed to be inserted thereinto, and makes contact with the rear end portion of the chamfered portions 15c. Thus, backward movement of the disk member 95 is restricted with respect to the spool shaft 15. In addition, an annular spacer 94 (see FIG. 10) is interposed and mounted between the disk member 95 and the rear end of the retaining member 47, and thus the disk member 95 is restricted to move backward in the spool shaft direction. Accordingly, even when the disk member 17 is pressed backward by the drag mechanism 60, the entire spool 4 is allowed to be received by the disk member 95.

The annular member 96 is a tubular ratchet wheel that the disk member 95 is mounted to the inner peripheral portion thereof from backward. The annular member 96 includes a plurality of saw-tooth portions 96a, a groove portion 96b, and a protruding portion 96c. The saw-tooth portions 96a are provided on the outer peripheral surface of the tubular portion of the annular member 96 at predetermined intervals in the peripheral direction, and allow the spool 4 to rotate only in the line-releasing direction. The saw-tooth portions 96a form a saw-tooth shaped concave-convex portion 91a. The groove portion 96b is formed on the rear end portion of the inner peripheral surface along the peripheral direction, and the rotation restricting member 97 is mounted to the groove portion 96b. The protruding portion 96c is formed to annularly protrude from the front side of the groove portion 96b along the inner peripheral direction of the central portion of the inner peripheral surface. The inner peripheral side of the tubular portion of the annular member 96 is disposed to be spaced from the second bearing 46. In other words, the outer diameter of the annular member 96 is formed to be larger than that of the second bearing 46.

The hitting member 92 is a hook-shaped pawl member, and includes a pawl portion 92a provided in the tip thereof and a mounting portion 92b provided in the base end thereof. Here, the mounting portion 92b is mounted to the attachment member 20 so as to be allowed to pivot around an axis parallel to the spool shaft 15, and thus the pawl portion 92a is allowed to contact/discontact the concave-convex portion 91a. The hitting member 92 is supported in the mounting portion 92b by a bolt shaped pivot shaft 98 that is screwed into a female threaded portion 20c formed in the rear end surface of the attachment member 20. A stopper 20d and an interlocking protrusion 20e are formed to protrude backward from the rear end surface of the attachment member 20 so that the female threaded portion 20c is arranged between the stopper 20d and the interlocking protrusion 20e. The stopper 20d makes contact with the hitting member 92 and restricts the hitting member 92 to excessively pivot inward in the diameter direction.

The urging member 93 urges the hitting member 92 toward the direction in which the pawl portion 92a makes contact with the concave-convex portion 91a (i.e., the saw-tooth portions 96a). The urging member 93 is a torsion coil spring, and includes a coil portion 93a, a first interlocking portion 93b, and a second interlocking portion 93c. The coil portion 93a is allowed to be wound around the outer peripheral side of the pivot shaft 98. The first interlocking portion 93b tangentially extends from one end of the coil portion 93a and is interlocked with the hitting member 92. The second interlocking portion 93c is provided across the pivot shaft 98 from the first interlocking portion 93b, and tangentially extends from the other end of the coil portion 93a. The interlocking portion 93b is interlocked with the hitting member 92 outward in the diameter direction of the pawl portion 92a. The second interlocking portion 93c is interlocked with the interlocking protrusion 20e that is provided in the attachment member 20.

The rotation restricting member 97 is a metal spring member that is bent in an approximately hexagon shape, and is mounted to the groove portion 96b of the annular member 96 so as to retain the disk member 95 from backward while it is urged toward the annular member 96. The rotation restricting member 97 is disposed such that each vertex on the outer peripheral portion makes contact with the inner peripheral portion of the groove portion 96b by the urging force. One of the end portions of the rotation restriction member 97 is bent frontward in the axial direction, and thus an interlocking portion 97a is formed to be interlocked with the cutout portion 95a of the disk member 95. Here, the interlocking portion 97a of the rotation restricting member 97 is interlocked with the disk member 95 that is non-rotatably mounted to the spool shaft 15, and the outer peripheral portion of the rotation restricting member 97 is mounted to the groove portion 96b of the annular member 96 while urged toward the annular member 96. Therefore, it is possible to control rotation of the annular member 96 with respect to the spool shaft 15 so as not to be easily performed.

In the sound producing mechanism 90 with the above configuration, the pawl portion 92a repeatedly makes contact with low-angle surfaces of the saw-tooth portions 96a when the spool 4 rotates in the line-releasing direction, and accordingly sounds are produced. In addition, when the spool 4 rotates in the line-winding direction, the pawl portion 92a makes contact with high-angle surfaces and presses the annular member 96 against the urging force applied by the rotation restriction member 97. Thus, the annular member 96 is relatively rotated to the disk member 95. Accordingly, sounds are not produced when the spool 4 rotates in the line-winding direction.

In addition, two interlocking portions 93b and 93c of the urging member 93 are disposed on both sides of the pivot shaft 98, and thus they are not aligned in the diameter direction of the spool. Accordingly, it is possible to reduce the size of the sound producing mechanism 90 in the diameter direction. Furthermore, it is possible to dispose the sound producing mechanism 90 compactly even when the diameter of the spool is formed to be relatively small.

Next, the handling and operation of the reel will be explained.

When casting, the bail arm 44 is flipped over to the line-releasing posture. Thus, the first bail support member 40 and the second bail support member 42 swing. In this situation, the fishing rod is cast while the fishing line is hooked by the index finger of the hand with which the fishing rod is held. Accordingly, fishing line is released with high momentum due to the weight of the tackle. After the tackle lands on the water, when the handle 1 is rotated in the line-winding direction, the rotor 3 rotates in the line-winding direction by means of the rotor driving mechanism 5, and the bail arm 44 returns to the line-winding posture by means of the bail flipping mechanism 53. Thus, fishing line is prevented from being released because the reverse rotation of the rotor 3 is prevented.

When fishing line is wound in, the handle 1 is rotated in the line-winding direction. When this occurs, the rotation is then transmitted to the rotor 3 through the face gear 11 and the pinion gear 12, and thus the rotor 3 rotates. When the rotor 3 rotates, fishing line guided by the line roller 41 is wound around the spool 4.

Also, when the spool 4 rotates in the line-releasing direction as the result of drag operation, as described above, the pawl portion 92a repeatedly makes contact with the low-angle surfaces of the saw-tooth portions 96a and accordingly the sound producing mechanism 90 produces sounds.

Furthermore, the rotor 3 has a configuration that the brackets 34c and 34d are provided in the pair of the outer cover members 34a and 34b in the rotor 3 and are interlocked with the bosses 30b and 30c provided in the rear cover member 33 so as to be movable in the protruding direction of the bosses 30b and 30c and be non-movable in the perpendicular direction to the protruding direction. Therefore, even when the outer cover members 34a and 34b are misaligned with the rear cover member 33 and the rotor body 7, it is possible to reduce misalignment between them to a maximum extent by adjusting the positions of the outer cover members 34a and 34b in the protruding direction (i.e., direction of the first axis X). Accordingly, it is possible to improve the design of the cover members 33, 34a, and 34b without increasing the cost for these members.

<Assembly Procedure of Reel Unit>

In a spinning reel with this configuration, the rotor driving mechanism 5 and the oscillation mechanism 6 are mounted in the interior of the reel unit 2, and the anti-reverse rotation mechanism 50 is mounted in the interior of the cylindrical portion 2e. In addition, the retaining member 27 is mounted to the reel body 2a when the interlocking portion 27c of the retaining member 27 is engaged with the first interlocked portion 2t. Before the retaining member 28 is mounted, the first screw member 28 is inserted into the interior of the retaining member 27, and the tip of the shaft portion 28b of the first screw member 28 is retained by the through hole 27e at the position indicated by the two-dot chain line of FIG. 6. Then, while this state is maintained, the lid member 2b is suitably attached to the reel body 2a and is fixed to the reel body 2a by the fixing bolts 80 and 82. Next, the reel unit protection member 26 is mounted from backward of the reel body 2a and the lid member 2b. Then, the first screw member 28 is pressed and screwed into the threaded hole 26d by a tool such as a driver and an Allen key, and thus the reel unit protection member 26 is fixed to the reel body 2a through the retaining member 27. As described above, with this configuration, there is a slight gap between the front end surface of the boss 26a of the reel unit protection member 26 and the rear end surface of the retaining member 27. Therefore, when the first screw member 28 is fastened, it is possible to pull the reel unit protection member 26 to the reel body 2a side even if the brim of the reel unit protection member 26 makes contact with the edge of the slanted portion 2n. Accordingly, the reel unit protection member 26 is slightly elastically deformed through the packing 26b, and is mounted to the reel body 2a without any gap. When these operations are completed, the cap 39 is mounted to the second insertion hole 2j. Thus the second insertion hole 2j is covered with the cap 39. In this way, the assembly of the reel unit 2 is completed.

According to the first embodiment, the retaining member 27 that retains the first screw member 28 is separately formed from the reel body 2a, and is disposed in the accommodation space RA so as to be non-movable with respect to the reel body 2a. Then, the retained screw member 28 is fixed to the front end portion of the boss 26a by a tool from outside, and thus the reel unit protection member 26 is fixed. Accordingly, it is possible to use a short screw member 28. Furthermore, it is possible to easily fix the reel unit protection member 26, and it is also possible to prevent the first screw member 28 from being exposed to the rear portion of the reel unit 2.

Second Embodiment

Figure 7:
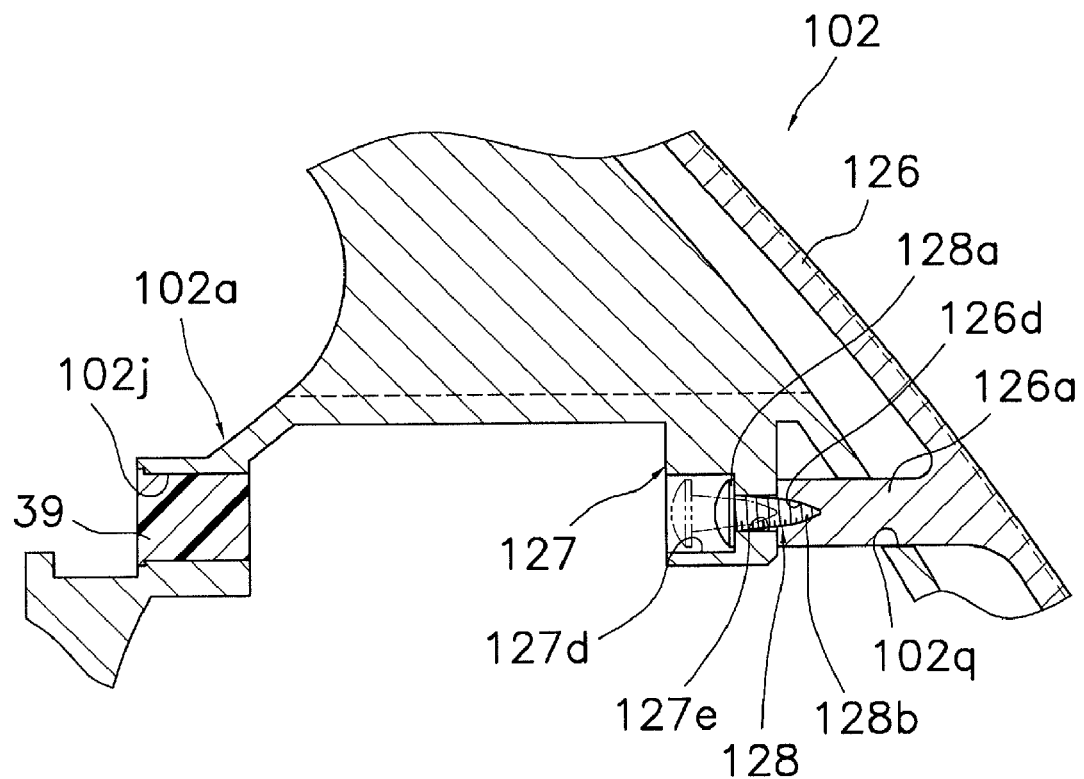
FIG. 7 is a view of a second embodiment corresponding to FIG. 6.

As illustrated in FIG. 7, according to the second embodiment, a retaining member 127 of a reel unit 102 is integrally formed with a reel body 102a. In addition, a tapping screw, which is capable of forming a female threaded portion when screwed into a portion, is also used as a screw member 128.

As illustrated in FIG. 7, the retaining member 127 is a plate-shaped member that is integrally formed with an upper portion or a wall portion of the reel body 102a, for instance. A head portion accommodation portion 127d and a through hole 127e are formed in the retaining member 127 so as to be concentrically disposed with the first and second insertion holes 102q and 102j. A head portion 128a of a screw member 128 is allowed to be accommodated in the head portion accommodation portion 127d, and a shaft portion 128b of the screw member 128 is allowed to be retained by the through hole 127e.

A threaded hole 126d in which a female threaded portion is formed by the screw member 128 is formed in the front end surface of the boss 126a of a reel unit protection member 126.

The second embodiment with this configuration also has the similar working effects as the first embodiment. In this embodiment, the configuration of the retaining member 127 is simplified because it is not necessary to non-movably couple the retaining member 127 to the reel body 102a.

Modified Embodiments of the First and Second Embodiments (a) In the above described embodiments, a screw member is exemplified as a fixing member. However, the fixing member of the present invention is not limited to the screw member. For example, an interlocking member including a pawl portion that is bent to the tip may be used as a fixing member, and may be preliminarily mounted to a retaining member. Also, an interlocked groove with which the pawl portion is interlocked may be formed in a boss. In this configuration, a crisscross or hexagon recess with which a tool is interlocked may be formed in the front end surface of the interlocking member.

(b) In the above described embodiments, the reel unit protection member also covers the rod attachment leg 2c. However, any type of member may be used as the reel unit protection member of the present invention as long as it is mounted from backward so as to cover the reel body and the lid member. For example, the reel unit protection member may cover only the reel body and the lid member, or may cover these members separately.

(c) In the above described embodiments, the retaining member is provided to be non-movable with respect to the reel body. However, it may be provided to be non-movable with respect to the lid member.

(d) In the above described embodiments, the first and second insertion holes 2q and 2j are concentrically disposed to be opposed to each other. However, they may not be concentrically disposed.

(e) In the above described embodiments, the first and second insertion portions are composed of the first and second insertion holes 2q and 2j. However, they may be composed of cutouts and the like instead of holes.

(f) In the above described embodiments, the second insertion hole 2j is covered with the cap 39. However, the second insertion hole 2j may be covered with the other component used in a reel such as the braking member 58 or the one-way crutch 51 of the anti-reverse rotation mechanism 50 without the cap 39.

Third Embodiment

In the first and second embodiments, the intermediate member or the retaining member 27, 127 is used for retaining the first screw member 28. In the third embodiment, the intermediate member is used for fixing the reel unit protection member to reel unit.

Figure 14:
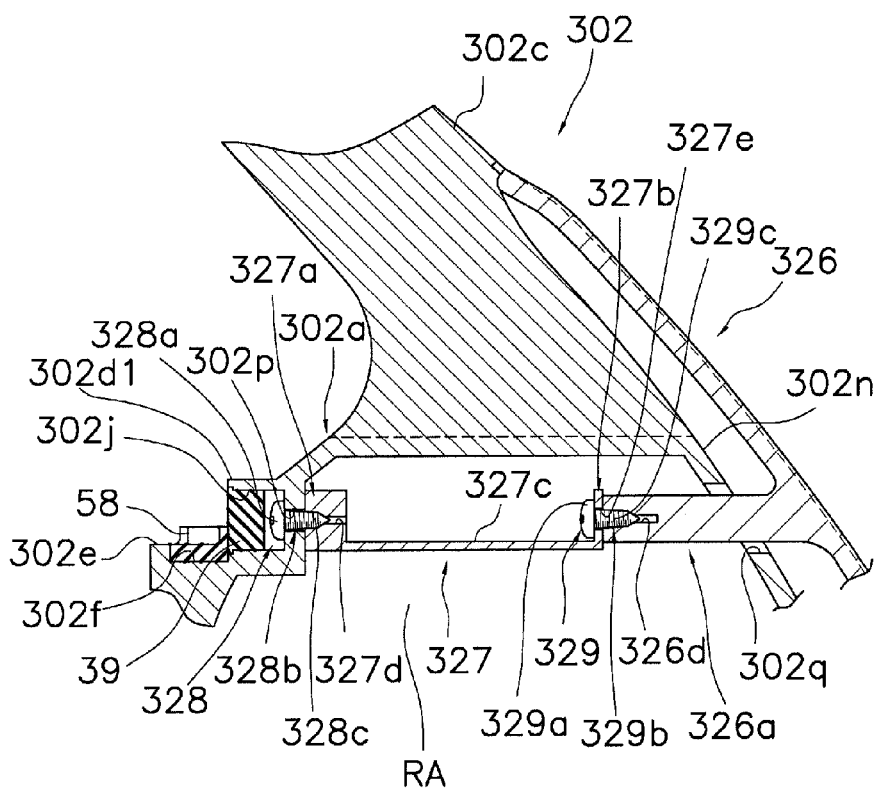
FIG. 14 is an enlarged cross-sectional view of a part to which a reel unit protection member is mounted according to the third embodiment.

As illustrated in FIG. 14, the reel body 302a of the reel unit 302 is made of a light alloy such as a magnesium alloy or an aluminum alloy, and is formed integrally with a T-shaped rod attachment leg 302c that is formed on the top of the reel body 302a to extend in a front-to-rear direction as is the case with the first embodiment. The accommodation space RA of the reel body 302a accommodates a rotor driving mechanism 5 and an oscillation mechanism 6 as is the case with the first embodiment. A first flange portion 302d1 and a cylindrical portion 302e are formed on the front end of the reel body 302a. The first flange portion 302d1 is formed in a substantially semicircular shape and makes up a part of a circular flange. The cylindrical portion 302e is open to the front and the diameter thereof is smaller than that of the flange. A screw member mounting hole 302j (an example of the second insertion portion) is formed in the upper portion of the first flange portion 302d1. A second screw member 328 (an example of a second fixing means) for fixing the reel unit protection member 326 is mounted to the screw member mounting hole 302j.

The screw member mounting hole 302*j* is capped by a cap 39 after the reel unit protection member 326 is attached by means of the second screw member 28.

As illustrated in FIG. 14, the second screw member 328 is a member that includes a head portion 328*a* and a shaft portion 328*b*. The shaft portion 328*b* is formed to have a diameter smaller than that of the head portion 328*a*, and a male threaded portion 328*c* is formed on the outer peripheral portion of the shaft portion 328*b*. In the third embodiment, a tapping screw that is capable of forming a female threaded portion is used. However, a commonly used bolt may be used instead of the tapping screw. A shaft portion insertion hole 302*p* with a small diameter, through which the shaft portion 328*b* is allowed to pass, is formed in the screw member mounting hole 302*j*. A mounting groove 302*f* is formed in the base end portion of the cylindrical portion 302*e* on the flange side, and the cross-section thereof is cut out in a circular shape. In addition, a braking member 58 of a rotor braking mechanism is mounted in the mounting groove 302*f*. Also, an intermediate member insertion hole 302*q* (an example of the first insertion portion) through which the intermediate member 327 is allowed to pass is formed at a position opposing to the screw member mounting hole 302*j* in the rear portion of the reel body 2*a*.

As is the case with the first embodiment, the lid member is made of a light metal such as a magnesium alloy and an aluminum alloy.

As is the case with the first embodiment, the reel unit protection member 326 is a member that is mounted from backward so as to cover the reel body 302*a* and the lid member. Specifically, the reel unit protection member 326 is mounted to a slanted portion 302*n* that formed on the rear portion of both the reel body 302*a* including the rod attachment leg 302*c* and the lid member through a packing 326*b* for suitably fitting these members. The reel unit protection member 326 includes a rod-shaped boss 326*a* to which the intermediate member 327 is fixed by a screw. The boss 326*a* is formed to penetrate the intermediate member insertion hole 302*q* from the back side of the reel body 302*a* and protrude toward the accommodation space RA.

The tip of the boss 326*a* protrudes so as to pass through the rear portion of the reel body 302*a* and face the intermediate member 327. The rear end portion of the intermediate member 327 is fixed to the tip of the boss 326*a* by a third screw member 329 (an example of the third fixing means). As illustrated in FIG. 14, in this embodiment, the third screw member 329 is configured to be similar to the second screw member 328, and includes a head portion 329*a* and a shaft portion 329*b*. The shaft portion 329*b* is formed to have a diameter smaller than that of the head portion 329*a*, and a male threaded portion 329*c* is formed on the outer peripheral portion of the shaft portion 329*b*. In addition, a tapping screw that is capable of forming a female threaded portion is also used as the third screw member 329 while it is used as the second screw member 328.

In response to this configuration, a threaded hole 326*d* is formed in the tip of the boss 326*a* such that a female threaded portion is formed in the threaded hole 326*d* when the third screw member 329 is screwed into the threaded hole 326*d*. The reel unit protection member 326 is fixed to the reel body 302*a* when the intermediate member 327 and the boss 326*a* pass through the intermediate member insertion hole 302*q* and the front end portion of the intermediate member 327 is fixed by the first screw member 328 while the intermediate member 327 is kept to be fixed.

As illustrated in FIG. 14, the intermediate member 327 is a C-shaped member that includes first and second portions 327*a* and 327*b* that are disposed to be opposed to each other and a coupling portion 327*c* that couples both of the portions 327*a* and 327*b*. The first and second portions 327*a* and 327*b* are rectangular plate-shaped portions, and thickness of the first portion 327*a* is formed to be thicker than that of the second portion 327*b*. A threaded hole 237*d* is formed on the outer end surface (front end surface) of the first portion 327*a*, and a female threaded portion is formed in the threaded hole 327*d* by the first screw member 328. In addition, a through hole 327*e* is formed in the second portion 327*b*, and the shaft portion 329*b* of the third screw member 329 is allowed to pass through the through hole 327*e*. The threaded hole 327*d* and the through hole 327*e* are concentrically disposed to each other.

With this configuration, even when the attachment posture of the intermediate member 327 varies around the axis of the through hole 327*e*, it is easy to screw the second screw member 328 into the threaded hole 327*d*. The coupling portion 327*c* couples the first and second portions 327*a* and 327*b* in one side. In this configuration, the coupling portion 327*c* couples the first and second portions 327*a* and 327*b* in one side and thus the intermediate member 327 is formed in a C shape. An object of using this configuration is to turn the third screw member 329, which is to be screwed into the boss 326*a*, with a tool such as a driver.

Figure 15:
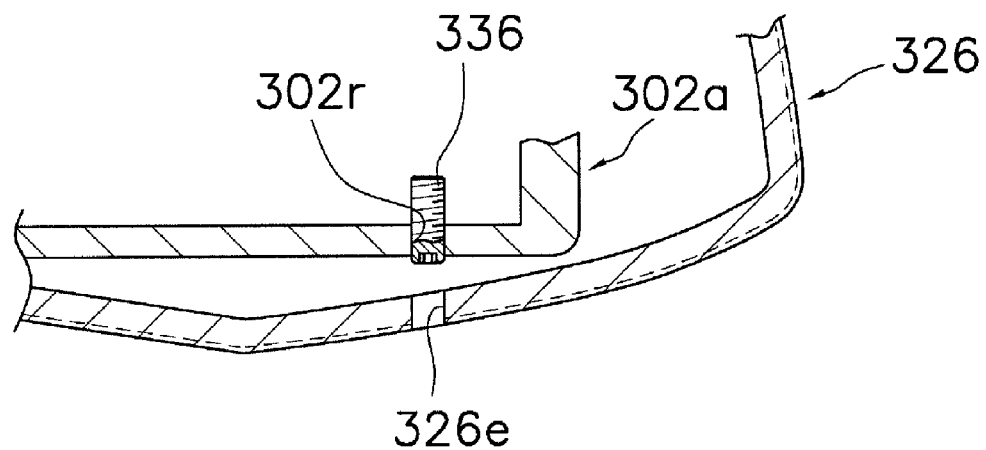
FIG. 15 is an enlarged cross-sectional view illustrating an interlocking method of a lower portion of the reel unit protection member.
Figure 16:
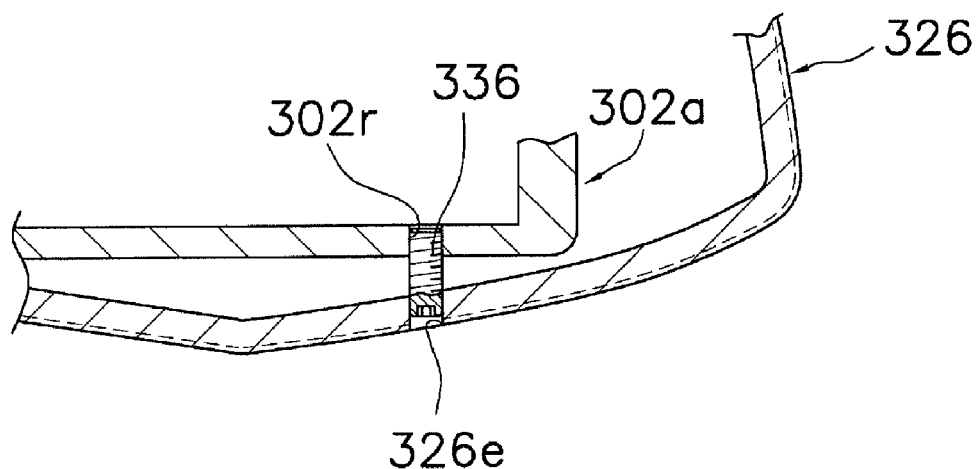
FIG. 16 is an enlarged cross-sectional view illustrating an interlocking method of a lower portion of the reel unit protection member.

As illustrated in FIGS. 15 and 16, an interlocking hole 326*e* is formed in a lower portion of the reel unit protection member 326. A threaded hole 302*r* is formed in the lower surface of the reel body 302*a* so as to be disposed at a portion opposing to the interlocking hole 326*e*. As illustrated in FIG. 15, a hexagon socket screw 336 is mounted to the threaded hole 302*r* from the bottom before assembly of the reel unit 302. Then, as illustrated in FIG. 16, after the reel unit protection member 326 is mounted to the reel body 302*a* and the lid member 302*b*, a tool such as an Allen key is mounted to the lower portion of the hexagon socket screw 336 and is then turned in a loosening direction. Thus, the hexagon socket screw 336 is moved toward the interlocking hole 326*e*, and the lower portion of the reel unit protection member 326 is interlocked with the hexagon socket screw 336. With this configuration, the lower portion of the reel unit protection member 326 is interlocked while the upper portion of the reel unit protection member 326 is fixed. Thus, wobbling of the reel unit protection member 326 is prevented.

According to the reel unit 302, the intermediate member 327 is provided between the boss 326*a* of the reel unit protection member 326 and the flange 302*d* of the reel body 302*a*, and thus the intermediate member 327 is allowed to be fixed to the reel body 302*a* while the intermediate member 327 is preliminarily fixed to the reel unit protection member 326. Accordingly, a short first screw member 328 may be used. Therefore, it is possible to easily fix the reel unit protection member 326.

<Assembly Procedure of Reel Unit>

In a spinning reel of the third embodiment with this configuration, the rotor driving mechanism 5 and the oscillation mechanism 6 are mounted in the interior of the reel unit 302, and the anti-reverse rotation mechanism 50 is mounted in the interior of the cylindrical portion 302*e*. In addition, the hexagon socket screw 336 is preliminarily mounted to the threaded hole 302*r* formed in the reel body 302*a*. At this time, the hexagon socket screw 336 is disposed not to protrude too much from the lower surface of the reel body 302*a* so that it does not block the reel unit protection member 326 to be mounted from backward. Then, while this state is maintained, the lid member is suitably attached to the reel body 302*a* and is fixed to the reel body 302*a* by the fixing bolts 80 and 82.

Next, the reel unit protection member 326 is mounted from backward of the reel body 302a and the lid member 302b. At this time, the intermediate member 327 is preliminarily fixed to the boss 326a of the reel unit protection member 326 by the second screw member 329. Then, the intermediate member 327 and the boss 326a are inserted into the intermediate member insertion hole 302q, and are pushed to a position where the front end portion of the intermediate member 327 makes contact with the rear surface of the flange portion. While the intermediate member 327 and the boss 326a are pushed to the position, the first screw member 328 is disposed in the screw member mounting hole 302j and is then screwed into the first portion 327a of the intermediate member 327 by a tool such as a driver. Thus, the intermediate member 327 is fixed to the reel body 302a. Next, the cap 39 is mounted to the screw member mounting hole 302j, and thus the screw member mounting hole 302j is covered with the cap 39. Finally, a tool such as an Allen key is disposed in the interlocking hole 326e, and the hexagon socket screw 336 is turned in a loosening direction by the stool so that the hexagon socket screw 336 protrudes toward the interlocking hole 326e. Thus, the hexagon socket screw 336 is interlocked with the interlocking hole 326e. In this way, the assembly of the reel unit 302 is completed.

In the third embodiment, the intermediate member 327 is allowed to be fixed to the reel body 302a while the intermediate member 327 is provided between the boss 326a of the reel unit protection member 326 and the reel body 302a, and is preliminarily fixed to the reel unit protection member 326 with third screw member 329. Therefore, a short second screw member 328 is allowed to be used. Accordingly, it is possible to easily fix the reel unit protection member 326, and it is also possible to prevent the first screw member 328 from being exposed to the rear portion of the reel body 302a.

Fourth Embodiment

Figure 17:
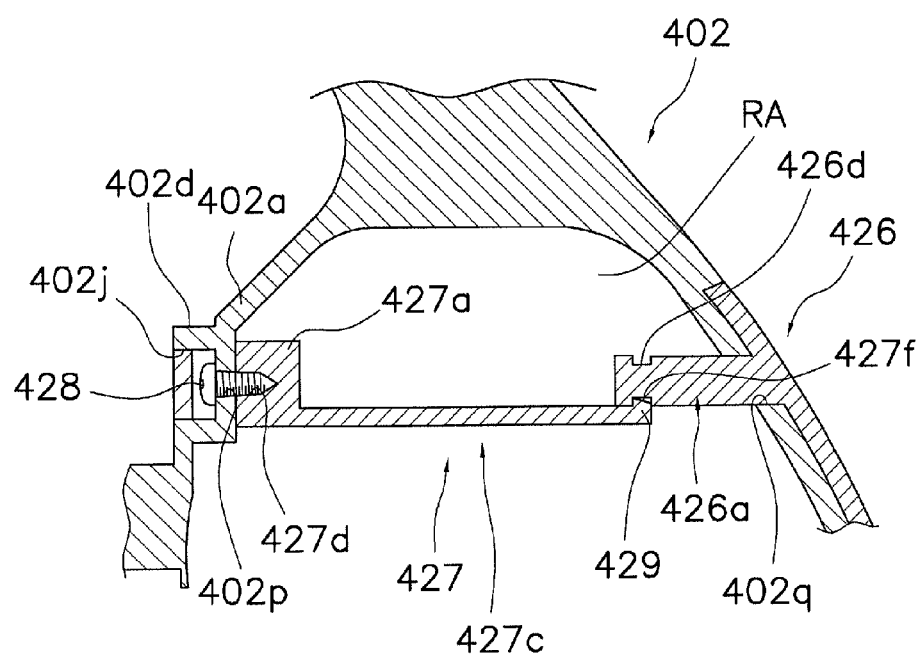
FIG. 17 is a view of a fourth embodiment corresponding to FIG. 4.

As illustrated in FIG. 17, in a reel unit protection member 426 of a reel unit 402 in accordance with the fourth embodiment, shapes of a boss 426a and an intermediate member 427 are different from those of corresponding members in accordance with the third embodiment.

A screw member mounting hole 402j, a screw member insertion hole 402p, and a boss insertion hole 402q are formed in a reel body 402a as is the case with the third embodiment.

The boss 426a of the reel unit protection member 426 is formed to pass through the boss insertion hole 402q and protrude toward the inner accommodation space RA as is the case with the first embodiment. An annular interlocked groove 426 d (an example of a second interlocked portion) is formed on the tip side of the outer peripheral surface of the boss 426a. The diameter of the boss insertion hole 402q is the same as or comparatively larger than the outer diameter of the boss 426a.

The intermediate member 427 is an elastic member that is made of a synthetic resin or a metal, and includes a first portion 427a with an approximately the same configuration as the first portion of the third embodiment, an interlocking protrusion 429 (an example of an second interlocking portion of a third fixing means) protruding upward to be interlocked with the interlocked groove 426d, and a coupling portion 427c coupling the first portion 427a and the interlocking protrusion 429. A threaded hole 427d into which the second screw member 428 is screwed is formed in the first portion 427a as is the case with the third embodiment. The interlocking protrusion 429 includes an oblique surface 427f on the upper portion thereof, and the thickness of the oblique surface 427f is decreased toward the rear end surface.

The fourth embodiment is different from the third embodiment in the following points. First, the intermediate member 427 is fixed to the inner surface of the flange portion 402d of the reel body 402a in the accommodation space RA by the second screw member 428. Then, the boss 426a of the reel unit protection member 426 is inserted into the boss insertion hole 402q and is pushed toward the intermediate member 427. When the tip of the boss 426a makes contact with the oblique surface 427f, the rear end portion of the intermediate member 427 in which the interlocking protrusion 429 is formed is bent in a downward direction of FIG. 17 by the action of the oblique surface 427f. Then, when the interlocking protrusion 429 is disposed in the interlocked groove 426d, the interlocking protrusion 429 is elastically stuck in and interlocked with the interlocked groove 426d. Accordingly, the reel unit protection member 426 is fixed to the reel body 402a.

With this interlocking structure, it is possible to fix the reel unit protection member 426 without a tool such as a driver. On the other hand, it is possible to remove the reel unit protection member 426 when the intermediate member 427 is unfixed by loosening the second screw member 428.

Fifth Embodiment

In the fifth embodiment, an interlocking structure is configured to be switched between an interlocked condition and an uninterlocked condition, depending on the condition how the second screw member is screwed.

Figure 18:
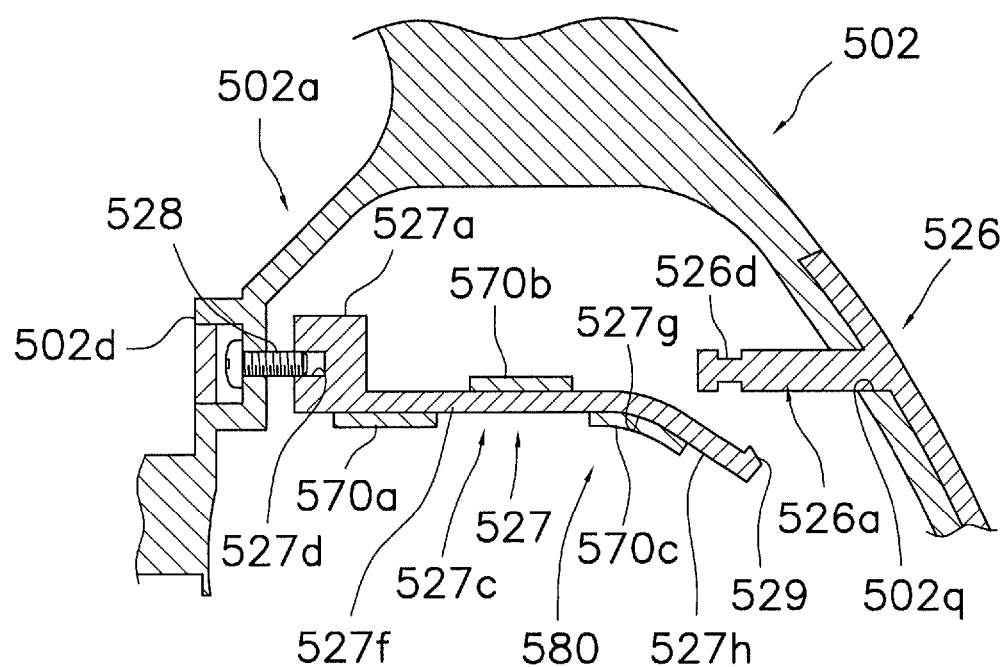
FIG. 18 is a view of an uninterlocked condition according to a fifth embodiment corresponding to FIG. 14.
Figure 19:
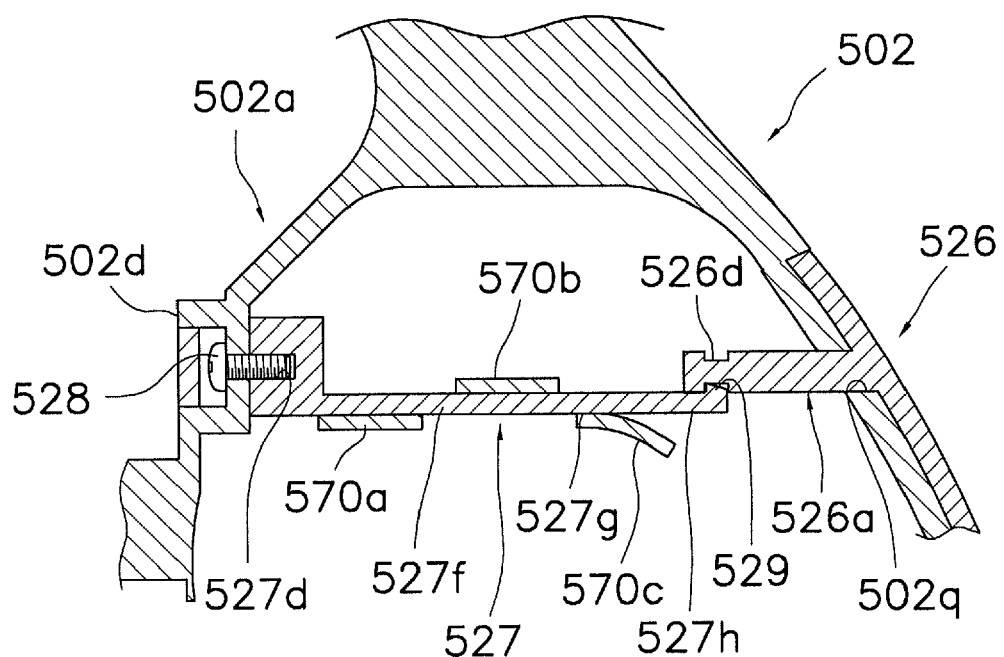
FIG. 19 is a view of an interlocked condition according to the fifth embodiment corresponding to FIG. 14.

As illustrated in FIGS. 18 and 19, the reel unit protection member 526 has a similar configuration as the reel unit protection member of the fourth embodiment, and the interlocked groove 526d is formed on the outer peripheral surface of the tip of the boss 526a.

An intermediate member 527 includes a first portion 527a that is formed in a similar shape to the first portion of the second embodiment, an interlocking protrusion 529 that is similar to the interlocking protrusion of the second embodiment, and a coupling portion 527c. The shape of the coupling portion 527c of the fifth embodiment is different from that of the coupling portion of the fourth embodiment, and the type of first screw member 528 of the fifth embodiment is different from that of the second screw member of the fourth embodiment in that the first screw member 528 is not a tapping screw but a general round-head bolt. Therefore, a threaded hole 527d including a female threaded portion is preliminarily formed in the first portion 527a.

The intermediate member 527 is an elastic member. The coupling portion 527c includes a first straight portion 527f that is continuously formed with the first portion 527a, a bent portion 527g that is bent downward from the first straight portion 527f, and a second straight portion 527h that is formed to extend from the bent portion 527g. The interlocking protrusion 529 is continuously formed with the second straight portion 527h. Therefore, as illustrated in FIG. 18, the coupling portion 527c of the intermediate member 527 is configured such that a portion of the intermediate member 527 defined from the bent portion 527g to the rear end is obliquely bent in an unrestricted condition.

A reel body 502a of a reel unit 502 includes members for guiding the intermediate member 527, such as three guides 570a, 570b, and 570c that are disposed at predetermined intervals in a front-to-rear direction outside the intermediate member 527. The guide 570a is a guide that makes contact with the lower surface of the first straight portion 527f of the coupling portion 527c of the intermediate member 527, and the guide 570b is a guide that makes contact with the upper surface of the first straight portion 527f. The guide 570c is a guide that makes contact with the lower surface of the bent portion 527g. Therefore, the guide 570c is bent along the bent portion 527g. Note that each of the guides 570a, 570b, and 570c is formed in a plate shape to protrude from the side wall of the reel body 502a to the lid member.

An interlocking condition switching unit 580 is composed of the guides 570a, 570b, and 570c, and the bent portion 527g. The interlocking condition switching unit 580 switches the interlocking condition of the interlocking protrusion 529, which is an interlocking portion of the second fixing means, between the interlocked condition and the uninterlocked condition, depending on the interlocking condition of the second screw member 528.

As illustrated in FIG. 8, in an unrestricted condition, the intermediate member 527 is configured so that the bent portion 527g is disposed along the guide 570c and the second screw member 528 is slightly screwed into the threaded hole 527d. This is the uninterlocked condition. Then, the second screw member 528 is fastened, the intermediate member 527 is moved in a leftward direction of FIG. 18, and the bent portion 527g is moved away from the bent portion of the guide 570c and makes contact with the straight portion. As a result, as illustrated in FIG. 19, the bent portion 527g is changed to be straight, and the interlocking protrusion 529 is interlocked with the interlocked groove 526d when the first portion 527a makes contact with the rear surface of the flange portion 502d. Thus, the interlocked condition is produced. On the other hand, when the second screw member 528 is pressed and turned in a loosening direction, the interlocking condition of the intermediate member 527 is gradually changed from the interlocked condition illustrated in FIG. 19 to the uninterlocked condition illustrated in FIG. 18. Thus, the interlocking protrusion 529 is uninterlocked with the interlocked groove 526d.

In this configuration, it is possible to easily switch the interlocking condition of the intermediate member 527 between the interlocked condition and the uninterlocked condition when the fixing condition of the second screw member 528 is changed by turning it in the loosening direction or the fastening direction.

Modified Embodiments of the Third to Fifth Embodiments (a) In the above described third embodiment, the intermediate member 327 is fixed to the reel unit protection member 326, and then the reel unit protection member 326 is inserted into the reel body 302a. However, even when a similar configuration to the third embodiment is employed, it is possible to mount the intermediate member 327 to the reel unit protection member 326 in the accommodation space RA after the reel unit protection member 326 is inserted into the reel body 302a.

(b) In the above described third embodiment, the intermediate member 327 is formed in a C shape. However, the shape of the intermediate member is not limited to that of the above described embodiment. For example, the intermediate member may be formed in an L shape without concentrically disposing the threaded hole and the through hole.

(c) In the above described third embodiment, a big gap is formed between the intermediate member insertion hole 302q and the boss 326a so that the intermediate member 327 is allowed to pass through the intermediate member insertion hole 302q. However, the base part of the boss 326a that is disposed in the intermediate member insertion hole 302q may be formed to be larger than the other part of the boss 326a. Accordingly, it may contact with the intermediate member insertion hole 302q. With this configuration, wobbling of the reel unit protection member 326 is further reduced.

(d) In the above described second and third embodiments, the annular interlocked groove is formed in the boss as the interlocked portion. However, the interlocked portion is not limited to be the annular groove, and may be any type of portion as long as it is configured to be interlocked with an interlocking portion such as an interlocked protrusion. For example, the interlocked portion may be composed of a plurality of members.

Figure 20:
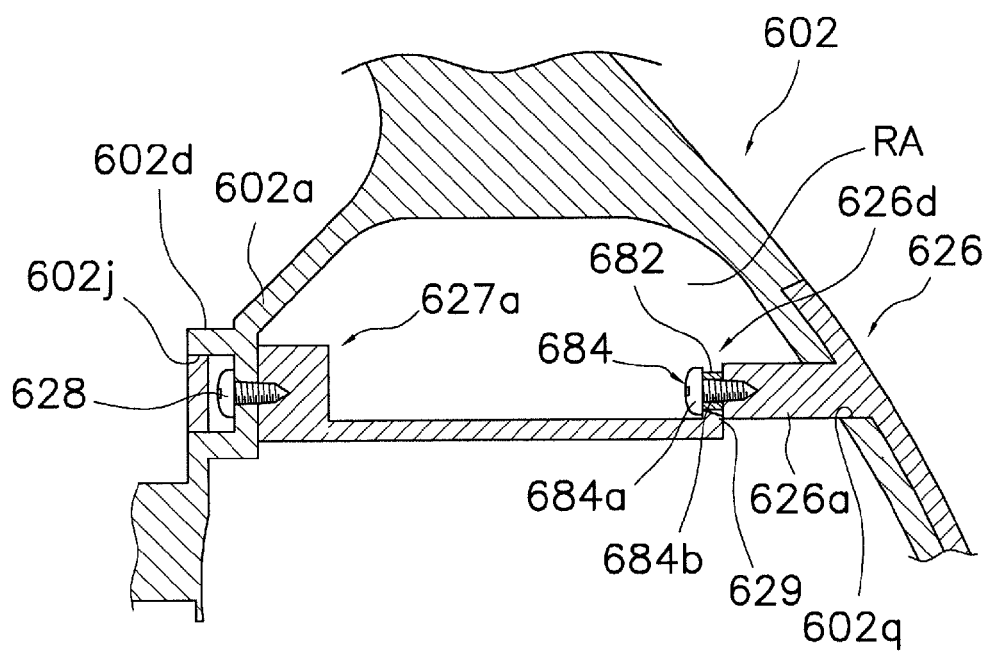
FIG. 20 is a view of another embodiment corresponding to a fourth embodiment of FIG. 17.

In FIG. 20, a boss 626a of a reel unit protection member 626 is formed to be shorter than the boss 426a illustrated in FIG. 17. An interlocked portion 626d is composed of a screw member 681 that is screwed into the tip of the boss 626a, and a collar member 682 to which a shaft portion 681b of the screw member is mounted. A head portion 681a of the screw member 681 may be interlocked with the interlocking protrusion 629 of the intermediate member 627. With this configuration, it is possible to reduce molding and processing cost for creating a groove.

The terms of degree such as "substantially", "about" and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A reel unit of a spinning reel that is arranged to wind fishing line, the reel unit comprising:
a reel body having a front side where the fishing line is released, a back side opposite to the front side, a lateral side connecting the front side and back side, an accommodation space opening to the lateral side, and a first insertion portion being communicated with the accommodation space;
a lid member being detachably/reattachably mounted to the reel body so as to cover the accommodation space;
a cover member being configured on the back side of the reel body so as to cover the reel body and the lid member, the cover member including a boss passing through the first insertion portion from the back side of the reel body, the boss protruding toward the accommodation space and having a front end portion on a side of the accommodation space; and
an intermediate member being unmovably configured on at least one of the reel body and the lid member within the accommodation space, the intermediate member fixing the boss to the reel body.

2. The reel unit of a spinning reel according to claim 1, further comprising
a first fixing means, wherein
the intermediate member retains the first fixing means, and
the first fixing means fixes the front end portion of the boss.

3. The reel unit of a spinning reel according to claim 2, wherein
the intermediate member is integrally formed with the reel body.

4. The reel unit of a spinning reel according to claim 2, further comprising
a second insertion portion being disposed on the opposite side of the first insertion portion, the second insertion portion being communicated with the accommodation space, wherein
the reel body includes a cap member that is arranged to cap the second insertion portion.

5. The reel unit of a spinning reel according to claim 4, wherein
the first fixing means is a first screw member that includes a first head portion formed on an end of the first screw member and a first shaft portion having a diameter smaller than a diameter of the first head portion, and includes a first male threaded portion on an outer peripheral portion of the first shaft portion,
the boss includes a female threaded portion, and
the first screw member is screwed into the female threaded portion of the boss.

6. The reel unit of a spinning reel according to claim 5, wherein:
the first screw member is a tapping screw.

7. The reel unit of a spinning reel according to claim 6, wherein
the intermediate member is integrally formed with the reel body.

8. The reel unit of a spinning reel according to claim 6, wherein
the intermediate member is separately formed from the reel body.

9. The reel unit of a spinning reel according to claim 8, wherein
the reel body includes an interlocked portion that is formed in the accommodation space, and
the intermediate member includes an interlocking portion that is interlocked with the interlocked portion.

10. The reel unit of a spinning reel according to claim 9, wherein
the intermediate member includes a through hole through which the first shaft portion of the first screw member passes.

11. The reel unit of a spinning reel according to claim 10, wherein
the intermediate member includes a head accommodation portion in which the head portion of the first screw member is accommodated.

12. The reel unit of a spinning reel according to claim 1, further comprising
a second fixing means, and
a third fixing means, wherein
the intermediate member includes a front end portion on the front side of the reel body and a rear end portion on the back side of the reel body,
the front end portion is fixed to the reel body by the second fixing member, and
the rear end portion is fixed to the boss by the third fixing means.

13. The reel unit of a spinning reel according to claim 12, wherein
the front end portion of the intermediate member is fixed to the reel body by the second fixing means inserted from the front side of the reel body.

14. The reel unit of a spinning reel according to claim 13, wherein
the second fixing means is a second screw member that includes a second head portion configured on an end of the second screw member and a second shaft portion having a diameter smaller than a diameter of the second head portion, and includes a second male threaded portion on an outer peripheral portion of the second shaft portion, and
the intermediate member includes a female threaded portion, and
the second screw member is screwed into the first female thread portion of the boss.

15. The reel unit of a spinning reel according to claim 14, wherein
the second screw member is a tapping screw.

16. The reel unit of a spinning reel according to claim 14, wherein
the third fixing means is a third screw member that includes a third head portion configured on an end of the third screw member and a third shaft portion having a diameter smaller than a diameter of the third head portion, and includes a third male threaded portion on an outer peripheral portion of the third shaft portion,
the intermediate member has a rear end portion on the back side of the reel body including a through hole through which the third shaft portion of the third screw member is inserted and passes,
the boss includes a female threaded portion, and
the third screw member is screwed into the female thread portion of the boss.

17. The reel unit of a spinning reel according to claim 16, wherein
the third screw member is a tapping screw.

18. The reel unit of a spinning reel according to claim 14, wherein:
the third fixing means includes an interlocking portion disposed on the back side of the reel body, and
the boss includes an interlocked portion with which the interlocking portion is interlocked.

19. The reel units of a spinning reel according to claim 18, wherein
the interlocking portion of the intermediate member is elastically interlocked with the interlocking portion of the boss.

20. The reel unit of a spinning reel according to claim 19, further comprising
an interlocking condition switching unit switching an interlocking condition of the third fixing means between an interlocked condition and an uninterlocked condition by changing an interlocking condition of the second fixing means.

* * * * *